(12) United States Patent
Plotkin et al.

(10) Patent No.: US 12,198,278 B2
(45) Date of Patent: Jan. 14, 2025

(54) MANIFESTING A VIRTUAL OBJECT IN A VIRTUAL ENVIRONMENT

(71) Applicants: Robert Plotkin, Englishtown, NJ (US); Steven K. Gold, Amherst, MA (US)

(72) Inventors: Robert Plotkin, Englishtown, NJ (US); Steven K. Gold, Amherst, MA (US)

(73) Assignee: Quabbin Patent Holdings, Inc., Marlborough, MA (US)

( * ) Notice: Subject to any disclaimer, the term of this patent is extended or adjusted under 35 U.S.C. 154(b) by 65 days.

(21) Appl. No.: 17/900,431

(22) Filed: Aug. 31, 2022

(65) Prior Publication Data

US 2023/0326145 A1  Oct. 12, 2023

Related U.S. Application Data

(60) Provisional application No. 63/342,459, filed on May 16, 2022, provisional application No. 63/329,249, filed on Apr. 8, 2022.

(51) Int. Cl.
*G06T 19/00* (2011.01)
*G06F 3/01* (2006.01)

(52) U.S. Cl.
CPC ............ *G06T 19/006* (2013.01); *G06F 3/011* (2013.01)

(58) Field of Classification Search
None
See application file for complete search history.

(56) References Cited

U.S. PATENT DOCUMENTS

| | | | | |
|---|---|---|---|---|
| 11,854,148 | B2* | 12/2023 | Ghatak | G06F 3/017 |
| 2019/0066380 | A1* | 2/2019 | Berk | G06F 3/012 |
| 2021/0192802 | A1* | 6/2021 | Nepveu | H04N 13/194 |
| 2021/0248827 | A1* | 8/2021 | Baier | G02B 27/0172 |
| 2022/0058977 | A1* | 2/2022 | Robinson | G09B 9/206 |

OTHER PUBLICATIONS

Hui Zhang et al., "A Virtual-Real Interaction Approach to Object Instance Segmentation in Traffic Scenes", IEEE Transactions on Intelligent Transportation Systems, vol. 22, No. 2, Feb. 2021, pp. 863-875 (Year: 2021).*
Oshua Lifton et al., "Dual Reality: Merging the Real and Virtual", F. Lehmann-Grube and J. Sablatnig (Eds.): FaVE 2009, LNICST 33, pp. 12-28, 2010. © Institute for Computer Sciences, Social-Informatics and Telecommunications Engineering 2010 (Year: 2010).*
Adrien Gaidon et al., "Virtual Worlds as Proxy for Multi-object Tracking Analysis", 2016 IEEE Conference on Computer Vision and Pattern Recognition (CVPR), IEEE Xplore: Dec. 12, 2016 (Year: 2016).*

* cited by examiner

*Primary Examiner* — Tize Ma
(74) *Attorney, Agent, or Firm* — Blueshift IP; Robert Plotkin

(57) ABSTRACT

Systems, methods, and storage media for manifesting a virtual object in a virtual environment are disclosed. Exemplary embodiments may: receive, at a first physical object detector, a first signal, from a first physical object-associated element in a first physical environment; identify, at a first value identification module, based on the first signal, a first value associated with the first signal; identify, at a first virtual object identification module, based on the first value, a first virtual object; and manifest, at a first virtual environment output device, a first manifestation of the first virtual object in a first manifestation of the first virtual environment.

29 Claims, 22 Drawing Sheets

MANIFESTING A VIRTUAL OBJECT IN A VIRTUAL ENVIRONMENT

SUMMARY

Systems and methods of at least some embodiments of the present invention include manifesting a virtual object in a virtual environment based on, and/or in response to, determining that a physical element of such an embodiment of the present invention—such as a physical object detector, virtual environment output device, mobile device, or user—in a physical environment is in proximity to a physical object in the physical environment. Systems and methods of at least some embodiments of the present invention include changing the manifestation of a virtual object in a virtual environment, and/or removing the manifestation of a virtual object in a virtual environment, based on, and/or in response to, determining the absence of proximity (also referred to as non-proximity), or a change in proximity, between a physical element in a physical environment and a physical object in the physical environment.

One aspect of the present disclosure relates to a system configured for manifesting a virtual object in a virtual environment. The system may include one or more hardware processors configured by machine-readable instructions. The hardware processor(s) may be configured to receive, at a first physical object detector, a first signal, from a first physical object-associated element in a first physical environment. The first physical object-associated element may be associated with a first physical object in the first physical environment. The processor(s) may be configured to identify, at a first value identification module, based on the first signal, a first value associated with the first signal. The first value may be associated with the first physical object, e.g., the first value may represent an identity of the first physical object. The processor(s) may be configured to identify, at a first virtual object identification module, based on the first value, a first virtual object. The processor(s) may be configured to manifest, at a first virtual environment output device, a first manifestation of the first virtual object in a first manifestation of the first virtual environment. The processor(s) may be configured to manifest, at a second virtual environment output device, a second manifestation of the first virtual object in a first manifestation of the second virtual environment.

Another aspect of the present disclosure relates to a method for manifesting a virtual object in a virtual environment. The method may include receiving, at a first physical object detector, a first signal, from a first physical object-associated element in a first physical environment. The first physical object-associated element may be associated with a first physical object in the first physical environment. The method may include identifying, at a first value identification module, based on the first signal, a first value associated with the first signal. The first value may be associated with the first physical object, and may represent an identity of the first physical object. The method may include identifying, at a first virtual object identification module, based on the first value, a first virtual object. The method may include manifesting, at a first virtual environment output device, a first manifestation of the first virtual object in a first manifestation of the first virtual environment. The method may also include manifesting, at a second virtual environment output device, a second manifestation of the first virtual object in a first manifestation of the second virtual environment. The method may include identifying and manifesting other virtual objects at the same or other virtual environment output devices, manifestations of such other virtual objects.

Yet another aspect of the present disclosure relates to a non-transient computer-readable storage medium having instructions embodied thereon, the instructions being executable by one or more processors to perform a method for manifesting a virtual object in a virtual environment. The method may include receiving, at a first physical object detector, a first signal, from a first physical object-associated element in a first physical environment. The first physical object-associated element may be associated with a first physical object in the first physical environment. The method may include identifying, at a first value identification module, based on the first signal, a first value associated with the first signal. The first value may be associated with the first physical object, and may represent an identity of the first physical object. The method may include identifying, at a first virtual object identification module, based on the first value, a first virtual object. The method may include manifesting, at a first virtual environment output device, a first manifestation of the first virtual object in a first manifestation of the first virtual environment. The method may also include manifesting, at a second virtual environment output device, a second manifestation of the first virtual object in a first manifestation of the second virtual environment. The method may include identifying and manifesting other virtual objects at the same or other virtual environment output devices, manifestations of such other virtual objects.

Aspects and embodiments of the present invention provide features and benefits, such as an ability to manifest a virtual object in a virtual environment based on proximity between a first physical object (e.g., a bicycle) and a second physical object (e.g., a physical object detector associated with a user) in a physical environment, as well as the ability to revise or remove a manifestation of a virtual object in a virtual environment based on the absence of proximity (non-proximity) between the first object and the second object, or a change in proximity between the first object and the second object, in the physical environment. Other features and advantages of various aspects and embodiments of the present invention will become apparent from the following description and from the claims.

DEFINITIONS OF TERMS USED HEREIN

Figure 1:
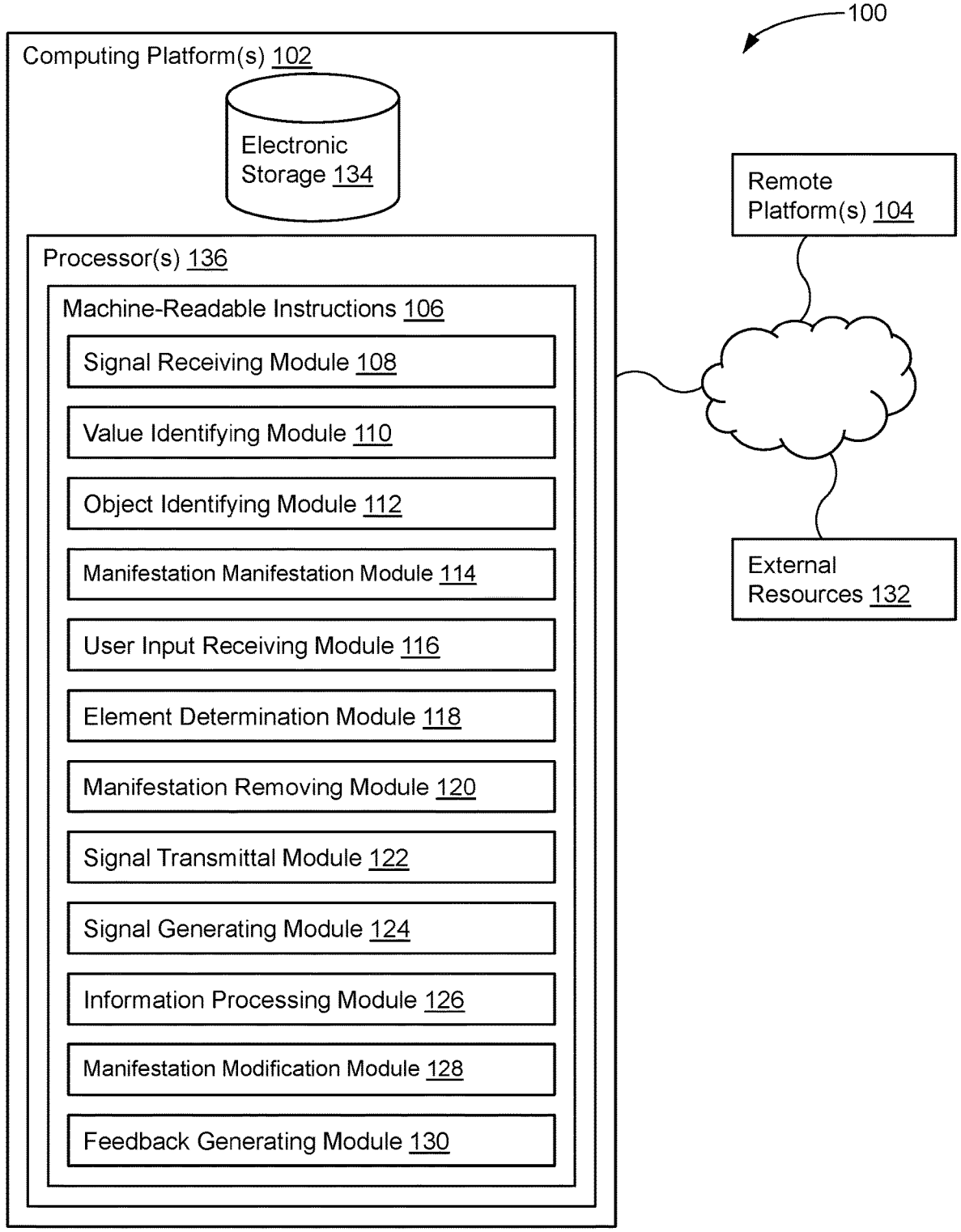
FIG. 1 illustrates a system configured for manifesting a virtual object in a virtual environment, in accordance with one or more embodiments of the invention.

Electronic Processing Means: In at least some embodiments of the present invention, "electronic processing means" refers to one or more physical objects which, in combination, are configured to receive electronic input and to perform one or more operations on that electronic input to produce electronic output. A computer is an example of electronic processing means. An analog circuit is an example of electronic processing means which may or may not be a computer.

Manifesting: In at least some embodiments of the present invention, "manifesting" refers to the process of generating, e.g., using electronic processing means, output (referred to herein as a "manifestation") representing digital data (e.g., a virtual environment and/or one or more virtual objects). Such a manifestation may include, for example, one or more of the following: visual output, auditory output, haptic output, and tactile output. In at least some embodiments of the invention, manifesting may be performed by, or take place at, a virtual environment output device, wherein a manifestation may be manifested using the virtual environment output device.

Non-Proximity: In at least some embodiments of the present invention, "non-proximity" is the absence (or lack) of proximity (as defined herein) between two physical objects, such as a first physical object-associated element that is associated with a first physical object, and a physical object (proximity) detector. For example, in at least some embodiments of the invention, non-proximity may exist when a first physical object (e.g., a first physical object-associated element that is associated with the first physical object) and a second physical object (e.g., a physical object detector that is not the first physical object-associated element or the first physical object) are more than some distance (e.g., 5 centimeters, 1 meter) apart from each other. As another example, in at least some other embodiments of the invention, non-proximity may exist when a first physical object communicates a first signal (e.g., by means of a first physical object-associated element that is associated with the first physical object), and a second physical object (e.g., a physical object detector that is capable of receiving or detecting the first signal, and that is not the first physical object-associated element or the first physical object) neither receives nor detects the first signal (e.g., there is a lack of receipt of the first signal, there is a failure to detect the first signal). At least some embodiments of the present invention may determine whether two physical objects are not in proximity (i.e., are in non-proximity) to each other based on one or more inputs relating to one or both of the two physical objects. Such a determination may include determining whether the one or more inputs satisfy a proximity criterion, such as determining whether the one or more inputs indicate that the two physical objects are beyond a certain distance of each other. As one example, an embodiment of the present invention may receive a first input representing a location of the first physical object and may receive a second input representing a second location of the second physical object, and determine whether the first physical object and the second physical object are in non-proximity to each other (e.g., more than a certain distance from each other) based on the first input and the second input. At least some embodiments of the present invention may treat the two physical objects as being in non-proximity to each other based on the results of such a determination, such as by treating the two physical objects as being in non-proximity to each other in response to determining that the two physical objects are more than the certain distance from each other. In a first example, two physical objects may be in non-proximity with each other, meaning that they are not in proximity with each other. Alternatively, two physical objects may, at a first time, be in non-proximity with each other, and then, at a second time after the first time, be in proximity with each other. In a third example, two physical objects may, at a first time, be in proximity to each other, and then, at a second time after the first time, be in non-proximity with each other. Two physical objects may, possibly repeatedly, change their proximity status relative to one another. In at least some embodiments, non-proximity is determined, detected, sensed, analyzed, and/or calculated using a physical object detector or a physical object detector (or other proximity sensing or detecting means), possibly including other local or remote processing means. In at least some embodiments, non-proximity is determined, detected, sensed, etc. when a first physical object detector associated with a first physical object (such as a mobile device, as one example) does not detect a signal from a first physical object-associated element associated with a second physical object. In this case, the failure to detect a signal determines (or may be used to determine) non-proximity between the first physical object and the second physical object. In at least some embodiments, a simple lack of detection of a signal (that is being communicated by a physical object-associated element, for example) by a physical object detector, indicates non-proximity between the physical object-associated element and the physical object detector. In various embodiments, non-proximity may be determined based on the absence of a signal, the lack of receipt of a signal (or the failure to receive a signal), the strength (or weakness) of a signal, the content of a signal, or some combination of these, as determined by a physical object detector or other element of a system of the invention. At least some embodiments of a physical object detector use a form of an electromagnetic sensor. At least some embodiments of a physical object detector use a radio or wireless signal, e.g., RFID, NFC. At least some embodiments of a physical object detector use a visual sensor, e.g., a camera. At least some embodiments of a physical object detector use an audio sensor, e.g., a microphone. In at least some embodiments, when a signal (such as a signal that is communicated by a first physical object-associated element that is associated with a first physical object) is not detected by a physical object detector (such as a physical object detector that is associated with a second physical object, e.g., a mobile communication device used by a first user), then a determination of non-proximity is made. Non-proximity may also be determined by determining that two physical objects—a first physical object and a second physical object—are not within a particular (e.g., defined) physical space at the same time, such as by using a computer, processor, and/or sensor means. Sensors may determine (or assist in the determination of) non-proximity between two physical objects by virtue of not detecting a signal, or detecting a signal strength below a threshold, as examples. In at least some embodiments, two physical objects that are in non-proximity are not in proximity. The phrases "not in proximity" and "non-proximity" are used interchangeably herein.

Object: The term "object," when not qualified by "physical" or "virtual" (e.g., "physical object," "virtual object"), may refer herein to a physical object or a virtual object.

Physical Environment: In at least some embodiments of the present invention, a "physical environment" is a physical space (e.g., a physical three-dimensional space) in which at least one physical object exists or may exist. At least some embodiments of a physical environment may contain a physical object, e.g., at least some physical object that is suited to the physical space dimensions that defines the physical environment. A physical environment exists continuously through time (e.g., it cannot be paused by a device input such as the push of a button). A physical environment behaves exclusively according to the natural laws of physics. A physical environment does not use virtual environment output means in order to be made real, or to exist. A physical environment is not a virtual environment (as those terms are defined herein).

Physical Object: In at least some embodiments of the present invention, a "physical object" is an object that is i) made of matter (e.g., atoms and/or molecules), ii) not digital data stored or transmitted by a computer or electronic processing means, and iii) not manifested using virtual environment output means. A physical object is not a virtual object, and a virtual object is not a physical object (as those terms are defined herein).

Physical Object-Associated Element: In at least some embodiments of the present invention, a "physical object-associated element" is a physical element that is attached to, integrated with, connected with, adhered onto, printed on, displayed at, contained within, or otherwise associated with a physical object of the present invention. A physical object-associated element may be distinct from, or the same as, the physical object with which the physical object-associated element is associated. A physical object-associated element is an example of a physical object, as that term is used herein. In at least some embodiments, a physical object-associated element communicates a signal. In at least some embodiments, a signal may, for example, be an electromagnetic, radio, visual (light-based), and/or audio (sound-based) signal. In at least some embodiments a signal may be passively and/or actively communicated. In at least some embodiments, a physical object-associated element may be a passive radio frequency identification (RFID) transmitter or active RFID transmitter. In at least some embodiments, a physical object-associated element may be a near-field communication (NFC) transmitter. In at least some embodiments, a physical object-associated element may be a Bluetooth transmitter or a Bluetooth Low Energy (BLE) transmitter. In at least some embodiments, a signal communicated by a transmitter may be received by a radio receiver or electromagnetic energy receiver means. In at least some embodiments, a physical object-associated element may be a manifestation of a code, such as a visual (e.g., printed or electronically displayed) QR code, barcode, or other visual code that visually (optically) communicates a signal. In at least some embodiments the signal contains the code. In at least some embodiments, the signal represents the code. In at least some embodiments, such a visual manifestation of a signal may be detected, sensed, or otherwise received by a camera or other optical receiver means. In at least some embodiments, a physical object-associated element may be a sound generation means, such as a speaker or other mechanism that outputs an audio signal and audibly communicates the signal. In at least some embodiments, such an audible signal may be detected, sensed, or otherwise received by a microphone and/or other sound receiver means. Other embodiments of physical object-associated elements, and other embodiments of signals communicated by physical object-associated elements, fall within the scope of the present invention. In at least some embodiments, a signal output by a physical object-associated element communicates information. In at least some embodiments, such a signal contains information. In at least some embodiments, such a signal communicates and/or contains information relating to the physical object. In at least some embodiments, the information relates to the identity of the physical object (e.g., the identity of the physical object and/or an identifier that facilitates the identification of the physical object). In at least some embodiments, the information relates to a characteristic or parameter of the physical object, or a characteristic or parameter of the physical environment within which the physical object exists. In at least some embodiments, such a signal communicates and/or contains information that is used in a determination of proximity or non-proximity of the physical object (and/or its associated physical object-associated element) relative to a physical object detector (and/or a sensor), or relative to another physical object (such as a mobile device of a user), as examples. In at least some embodiments, a process of identifying that two physical objects are in proximity (or non-proximity) includes the process of determining that the two physical objects are in proximity (or non-proximity). In at least some embodiments of a signal, information communicated by and/or contained in a signal may be communicated as information content of the signal, or by virtue of a feature of the signal itself, such as a measure of the strength of the signal.

Proximity: In at least some embodiments of the present invention, "proximity" means that two physical objects are positioned within a certain distance from each other, such as being near or close to each other, as may, for example, be quantified using a unit of distance measurement, e.g., meters. For example, in at least some embodiments of the invention, proximity may exist when a first physical object (e.g., a first physical object-associated element that is associated with the first physical object) and a second physical object (e.g., a physical object detector that is not the first physical object-associated element or the first physical object) are less than some distance (e.g., 5 centimeters, 1 meter) apart from each other. As another example, in at least some other embodiments of the invention, proximity may exist when a first physical object communicates a first signal (e.g., by means of a first physical object-associated element that is associated with the first physical object), and a second physical object (e.g., a physical object detector that is capable of receiving or detecting the first signal, and that is not the first physical object-associated element or the first physical object) receives or detects the first signal. In any embodiments disclosed herein which identify that a first physical object is in proximity to a second physical object, identifying may include determining that the first physical object is in proximity to the second physical object. At least some embodiments of the present invention may determine whether two physical objects are in proximity to each other based on one or more inputs relating to one or both of the two physical objects. Such a determination may include determining whether the one or more inputs satisfy a proximity criterion, such as determining whether the one or more inputs indicate that the two physical objects are within a certain distance of each other. As one example, at least some embodiments of the present invention may receive a first input representing a location of the first physical object, and may receive a second input representing a second location of the second physical object, and determine whether the first physical object and the second physical object are in proximity to each other (e.g., within no more than a certain distance from each other) based on the first input and the second input. At least some embodiments of the present invention may treat the two physical objects as being in proximity to each other (or not in proximity to each other) based on the results of such a determination, such as by treating the two physical objects as being in proximity to each other in response to determining that the two physical objects are not more than the certain distance from each other. In some embodiments of the invention, proximity may exist between two physical objects when there is no more than a relatively small distance between the two physical objects, such as a few millimeters or centimeters, for example. In some embodiments, proximity may exist between two physical objects when there is no more than a relatively large distance between the two physical objects, such as several decimeters or meters. In at least some embodiments, proximity may serve as a proxy for the use of, or interaction with, a physical object by a user (when, for example, a physical object-associated element that is associated with a physical object is in proximity with a physical object detector that is an element of a mobile communication device in possession of a user). A distance may be a specific or predetermined distance (e.g., less than 1 meter), or an approximate distance (e.g., less than 1 meter+/−0.5 meters), as may be determined by a system or method of the invention. In addition, proximity may be determined based on the presence of a signal (e.g., a signal receiver or physical object detector detects the presence of the signal), receipt of a signal (e.g., a signal receiver or physical object detector receives the signal), characteristic or strength of a signal (e.g., a signal receiver or physical object detector facilitates a determination that a signal strength is above a predetermined threshold), or content of a signal (e.g., a signal receiver or physical object detector processes information contained in the signal to determine proximity). In at least some embodiments, such a signal may be communicated by or using a physical object-associated element that generates, transmits, displays, presents or otherwise communicates the signal, for example. In at least some embodiments, the signal may be received by or using a physical object detector or other signal receiver or sensor means, for example. In at least some embodiments, a measure of proximity is between a first point at a first physical object, and a second point at a second physical object, wherein the first and second physical objects are distinct from one another, and may be positioned or moved closer together (e.g., to be brought into proximity), or farther apart (to be moved out of proximity, or moved to a position of non-proximity), from each other. In at least some embodiments, proximity may be determined, detected, sensed, analyzed, or calculated, or some combination of these methods, involving a physical object detector, and possibly also local or remote processing means. In at least some embodiments, proximity may be determined directly, such as by means of a proximity detector means or physical object detector that determines proximity. In at least some embodiments, proximity may also be determined indirectly, such as by determining that two physical objects are (or were, if determining retroactively) within a predetermined distance from each other at a point in time (e.g., the two objects are/were in the same place at the same time). In at least some embodiments, proximity may be determined automatically, such as by a constantly operating physical object detector (that continuously monitors for proximity, for example), or non-automatically, such as by means of an intervention of a physical object detector, or by intervention of a user (possibly including manual manipulation of an element of the invention by the user, for example), as examples. In at least some embodiments, proximity may be a binary characteristic, e.g., two distinct physical objects (such as a physical object-associated element associated with a physical object, and a physical object detector) may either be in proximity with each other, or not in proximity (in non-proximity) with each other. In at least some embodiments, proximity is a non-binary characteristic, and may be quantified as a measure of distance or a signal strength, as examples. In at least some embodiments, proximity is determined, detected, sensed, analyzed, and/or calculated using a physical object detector means or a physical object detector. In at least some embodiments, proximity is determined, detected, sensed, etc. when a first physical object detector associated with a first physical object (such as a mobile device, as one example) detects a first signal from a first physical object-associated element associated with a second physical object. In this case, the detection of such a first signal indicates, or may be used to determine, that proximity between the first physical object and the second physical object exists. In at least some embodiments, simple detection of a signal (that is being communicated by a physical object-associated element) by a physical object detector indicates proximity between the physical object-associated element and the physical object detector. At least some embodiments of a physical object detector use an electromagnetic sensor. At least some other embodiments of a physical object detector use a radio receiver or wireless signal receiver, e.g., an RFID or NFC transmitter tag receiver. At least some other embodiments of a physical object detector use an optical sensor (e.g., a camera) to receive an optical signal. At least some other embodiments of a physical object detector use an audio sensor (e.g., a microphone) to receive an audio signal. In at least some embodiments, when a signal (such as a signal that is communicated by a physical object-associated element that is associated with a physical object) is detected by a physical object detector (such as a physical object detector that is associated with a second physical object, such as a mobile device that is used by a user), then a determination of proximity is made. In at least some embodiments proximity may be determined based on the presence of a signal, the receipt of a signal, the strength of a signal, a characteristic of a signal, or the content of a signal, or some combination of these. Additionally, proximity may also be determined by determining that two physical objects—a first physical object and a second physical object—are within a particular (e.g., defined) physical space at the same time, such as by using a computer, processor, and/or sensor means. In at least some embodiments, two physical objects that are in proximity are not in non-proximity.

Space: In at least some embodiments of the present invention, a "space" is a physical or virtual region having two or more dimensions (e.g., two dimensions, three dimensions) within which entities exist. A space may be bounded or boundless. Entities may have properties within a space, such as any one or more of the following: position (e.g., as defined by coordinates within the dimensions of the space; for example, in a three-dimensional space, an entity existing within the space may have a position that is represented by coordinates x, y, and z), mass, and velocity. A set of laws of physics, such as natural laws of physics (in the case of a physical space) or artificial laws of physics (in the case of a virtual space), may govern the behavior of entities within a space, whether that set of laws of physics is (fully or partially) known to humans. In a virtual space, the artificial laws of physics that govern the behavior of entities within the virtual space may or may not simulate, or be equal to or an approximation of, the natural laws of physics. Time may pass within a space. Time may pass in a virtual space at a different rate (or possibly in a different direction) than in physical space. The properties of entities within a space may change over time. A manifestation of a space may have a different number of dimensions than the space. For example, a space may have three dimensions and a manifestation of the space may have two dimensions. A "physical object," as that term is used herein, is an example of an entity in a physical space. A "virtual object," as that term is used herein, may represent an entity in a virtual space. A physical space is not a virtual space, and a virtual space is not a physical space (as those terms are defined herein).

Virtual Environment: In at least some embodiments of the present invention, a "virtual environment" is a virtual object which represents a virtual entity, where the virtual entity contains at least one other virtual entity represented by at least one other virtual object. Virtual environment output means may manifest a virtual environment to generate a manifestation of the virtual environment. In at least some embodiments of the present invention, a virtual environment may be a simulation of a physical environment or of a fictional environment. In at least some embodiments, a virtual environment is generated by electronic processing means. In at least some embodiments, a virtual environment includes digital data representing behaviors according to a digital model, such as a digital model of laws of physics. Such a digital model of laws of physics may or may not simulate natural laws of physics (i.e., the laws of physics that govern the physical universe). In at least some embodiments, the digital model of laws of physics may be modified versions of natural laws of physics, such as laws of physics in which there is a smaller or larger gravitational force than in natural laws of physics, for example. An embodiment of a virtual environment may perfectly, or approximately (e.g., within some margin of error), simulate a physical environment, such as a particular interior physical space or physical cityscape that exists in a physical environment. Such an embodiment is an example of what is referred to herein as a "non-fictional virtual environment." An embodiment of a virtual environment may also simulate a fictional environment (e.g., an environment which is made up, imagined, or which otherwise is not the same as any physical environment), which may (in some or all of its aspects) resemble a physical environment. For example, one embodiment of a fictional virtual environment may closely simulate a physical environment with regard to the relative positions and dimensions of its virtual objects, but may be manifested visually using different colors than the physical environment which it otherwise simulates or resembles. As another example, an embodiment of a fictional virtual environment may have certain behaviors which exist in the physical environment (e.g., laws of physics, such as the law of gravity), but which behave differently (at least in part) in the fictional virtual environment than in the physical environment (e.g., a virtual earth with zero gravity). In at least some embodiments, a virtual environment represents a virtual entity which includes, or is made of, at least one virtual object. In at least some embodiments, a collection of virtual objects may create or define a virtual entity represented by a particular virtual environment. As another example, an avatar—e.g., a simulation of an actual or fictional person—may exist, and move around in, an embodiment of a virtual entity represented by a virtual environment. In another embodiment of a virtual environment, a first avatar simulating a first real person may interact with a second avatar simulating a second real person within a virtual entity represented by the virtual environment. In another embodiment of a virtual environment, a first avatar simulating a first real person may interact with a second avatar representing a second fictional person within a virtual entity represented by the virtual environment. In another example of an embodiment of a virtual environment, an avatar (a first virtual object) interacts with a second virtual object, e.g., the avatar sits on a virtual chair, or walks along a virtual walking path, or wears a virtual hat, or observes a virtual bird fly through the virtual air in a virtual entity represented by the virtual environment. In at least some embodiments, a virtual environment is a simulation of a physical environment. In at least some embodiments, a virtual environment is a representation of a physical environment. A virtual environment is not a physical environment (as those terms are defined herein).

Virtual Environment Output Means: In at least some embodiments, "virtual environment output means" (also referred to as a "virtual environment output device") refers to a means, such as a device, for manifesting one or more virtual objects and/or one or more virtual environments. Examples of virtual environment output means include a virtual reality (VR) headset, an augmented reality (AR) device, a mixed reality (MR) device, and a digital display. For clarity, while a VR headset is an example of a physical object, an image of a virtual object (as defined herein, e.g., an avatar) generated by a computer executing software and manifested as visual output using an output or display means (e.g., a VR headset) is not a physical object. An example of an embodiment of a physical object is a living, breathing person—such as the patent examiner reading this patent application—who thinks, translocates in the physical world, is made of matter, is not digital data transmitted or stored by electronic processing means, and is not manifested using virtual environment output means. An embodiment of a physical object may also be a non-living (e.g., inanimate) physical object, such as a thing that is also made of matter, not digital data transmitted or stored by electronic processing means, and not manifested using virtual environment output means. Without limitation, a physical object that is a thing may, for example, be a product, item of clothing, footwear, sneaker, mode of transportation, car, bike, aircraft, boat, food or beverage item, tool, building, house, apartment, office, or furnishing.

Virtual Object: In at least some embodiments of the present invention, a "virtual object" is digital data stored and/or transmitted by electronic processing means. In at least some embodiments of the present invention, a virtual object may be manifested using virtual environment output means. In at least some embodiments of the present invention, a "virtual object" is a simulation (a "simulation" is defined as an imitation of the operation of a physical or real-world process or system, such as a physical environment and/or one or more physical objects, over time) of an object (e.g., of a physical, fictional or imagined object) that is generated by electronic processing means, possibly involving the use of software, and capable of being manifested using virtual environment output means. In at least some embodiments, a virtual reality headset, augmented reality device, and mixed reality hardware are examples of virtual environment output means. An embodiment of a virtual object may include a set of digital parameters and corresponding values. Such parameters and/or corresponding values may change over time. In at least some embodiments, such parameters and values may additionally be stored in one or more computer-readable media. In one embodiment, digital data representing a virtual bicycle—e.g., a simulation of a physical bicycle, such as a bicycle that may be purchased in a physical bicycle store and pedaled along a real-life bicycle path by an actual living person—is an example of a virtual object. In another embodiment, digital data representing an avatar—e.g., a simulation of an actual or fictional person existing in a virtual environment—is an example of a virtual object. In yet another embodiment, data representing a virtual object that is a virtual t-shirt (e.g., a simulation of an actual 100% cotton t-shirt, worn on the body of a living human user of a virtual environment output device) may be simulated in a virtual environment as a virtual t-shirt worn on the user's avatar (while the virtual user is riding her virtual bicycle in the virtual environment). In at least some embodiments, a virtual object is a simulation of a physical object. In at least some embodiments, a virtual object is a representation of a physical object. A virtual object is not a physical object, as those terms are defined herein.

DETAILED DESCRIPTION

In at least some embodiments, a person (e.g., a first person, a first user) using a portable computing device (e.g., a mobile phone, smart watch) having a built-in physical object detector (e.g., radio receiver, camera, microphone, first physical object detector) is in non-proximity with a physical object (e.g., thing, place, person, first physical object). The user subsequently relocates and/or comes into proximity (from the earlier position of non-proximity) with the physical object. In the embodiment, the physical object includes a physical object-associated element (e.g., printed code, QR code, barcode, identifying image, RFID transmitter tag, NFC transmitter tag, Bluetooth transmitter tag, speaker, first physical object, first physical object-associated element) that is associated with—attached to, integrated with, printed on, or otherwise associated with—the physical object. In the embodiment, when the physical object detector (that may be associated with a user's mobile device and the user, or with another system element), and the physical object-associated element (that is associated with the physical object) are in proximity with each other, a signal (e.g., electromagnetic signal, radio signal, visual or optical signal, audio or sound signal, first signal) is actively or passively communicated by the physical object-associated element, and is received by the physical object detector. In the embodiment, the user, the physical object, the physical object-associated element and the physical object detector exist in the physical environment. In the embodiment, the physical object-associated element (along with its associated physical object), and the physical object detector (along with any mobile device or user associated with it), are not the same physical objects, and are distinct from each other. In the embodiment, a value identification module (e.g., at the mobile device, processor, remote computer, first value identification module) identifies a value (e.g., first value) based on the signal communicated by the physical object-associated element (and received or otherwise detected by the physical object detector), whereby the value is associated with the signal. In the embodiment, the value is also associated with the physical object (e.g., the value represents an identity of the physical object, the value represents a characteristic of the physical object). In the embodiment, a virtual object identification module (e.g., at the mobile device, processor, remote computer, first virtual object identification module) identifies a first virtual object based on the first value. In the embodiment, the value is communicated (e.g., transmitted) from the value identification module to the virtual object identification module (which receives the value). These modules may be embodied as the same processing module, or as distinct processing modules which may be co-located or physically separate from each other. In the embodiment, a virtual environment output device (e.g., virtual reality headset, augmented reality device, mixed reality device, first virtual environment output device) manifests a manifestation (e.g., a first manifestation) of the virtual object in a manifestation of the virtual environment (e.g., first virtual environment). In the embodiment, a user may perceive the manifestation of the virtual object that is manifested in the virtual environment using the virtual environment output device.

In a second embodiment of the present invention, following manifestation of the virtual object in the virtual environment, for example, a user (and the user's mobile device that includes a physical object detector) relocates or moves to subsequently be in non-proximity (not in proximity) with the physical object (and the physical object's physical object-associated element that communicates the signal). In this embodiment, based on the non-proximity, the system determines the non-proximity (e.g., by means of no longer receiving the signal at the physical object detector, by means of determining an absence of the signal at the physical object detector, by means of determining a change in a signal-related characteristic such as the signal's strength, by means of the information communicated by the signal, by other means of determining that the physical object-associated element and the physical object detector are in non-proximity with each other, by means of determining that the physical object-associated element is in proximity with a physical object other than the first or originally detected physical object). Based on the determination of non-proximity, the embodiment subsequently revises or updates the manifestation of the virtual object, such as by changing the manifestation of the virtual object (or an aspect of the virtual object) in the manifestation of the virtual environment, or by removing or deleting the manifestation of the virtual object from the manifestation of the virtual environment.

For example, a user walks from inside her home, where she is in non-proximity (not in proximity) with her bicycle, to a location outside of her home near where her bicycle is stored, to be in proximity with her bicycle. In at least some embodiments, proximity between the user and her bicycle is determined or identified by means of a Bluetooth Low Energy tag (a form of physical object-associated element), such as a tag attached to the frame of her bicycle, which communicates a radio signal that is received by a radio receiver (a form of physical object detector) in the mobile device that she carries with her in her pocket. Receipt of the signal is passive and does not (in this example) require any user action or intervention. The signal contains information that represents the identity of the user's bicycle. Based on this information (e.g., a value), the system identifies a virtual object, such as a virtual object representing a virtual bicycle that simulates the user's physical bicycle. This virtual object—the virtual object representing the user's virtual bicycle—is then manifested, by a virtual environment output device, in a virtual environment. The virtual object may be stored in at least one non-transitory computer-readable medium, for example. The virtual object may be manifested by one or more virtual environment output means, concurrent with the user's use of the bike, or at another time. The user's personalized avatar may be simulated as riding her virtual bicycle in the virtual environment, for example. In the embodiment, at a later time, when the user parks her physical bicycle and moves away from it (transitions from proximity to non-proximity with her physical bicycle), the system may identify the non-proximity between the user and her physical bicycle, and no longer show her avatar riding her virtual bicycle in the virtual environment. In another embodiment, at a later time, when the user parks her physical bicycle and moves away from it (transitions from proximity to non-proximity with her physical bicycle), the system may determine the non-proximity between the user and her physical bicycle, and no longer show her bicycle in the virtual environment. Other methods, scenarios, system elements, physical objects, and more, are within the scope of embodiments of the present invention.

In some embodiments of the present invention, a user may control or change (e.g., update, modify) the user's position in an embodiment of a virtual environment, such as to enable the user to explore or move around the virtual environment. In some embodiments of the invention, a user may control or change (e.g., update, modify) the user's view of an embodiment of a virtual environment, such as to enable the user to explore, or move around in, the virtual environment. This may enable the user to view the virtual environment from a new perspective or vantage point, or in a new or different way. Such control of the user's position in, or view of, the virtual environment may be facilitated by a virtual environment control means, which may be operated or controlled by a user. At least some embodiments of a virtual environment control means may be or include, without limitation, finger operated or hand-held means, body worn means, sensor means, brain interface means, physiologic sensor means, camera means, a touch screen, and/or eye tracking means. At least some embodiments of a virtual environment control means may be integrated with a virtual environment output device.

In at least some embodiments of the present invention, a user may be able to manipulate a virtual object in a virtual environment. This may enable a user to change, alter, modify, update, add to, subtract from, and/or remove a virtual object in the virtual environment. Such control of the user's position in, or view of, the virtual environment may be facilitated by a virtual object control means (which may be the same or different as the virtual environment control means), which may be operated or controlled by a user. At least some embodiments of a virtual object control means may be or include, without limitation, finger operated or hand-held means, body worn means, sensor means, brain interface means, physiologic sensor means, camera means, a touch screen, and/or eye tracking means. At least some embodiments of a virtual environment control means may be integrated with a virtual environment output device.

FIG. 1 illustrates a system 100 configured for manifesting a virtual object in a virtual environment, in accordance with one or more embodiments. In some embodiments, system 100 may include one or more computing platforms 102. Computing platform(s) 102 may be configured to communicate with one or more remote platforms 104 according to a client/server architecture, a peer-to-peer architecture, and/or other architectures. Remote platform(s) 104 may be configured to communicate with other remote platforms via computing platform(s) 102 and/or according to a client/server architecture, a peer-to-peer architecture, and/or other architectures. Users may access system 100 via remote platform(s) 104.

Computing platform(s) 102 may be configured by machine-readable instructions 106. Machine-readable instructions 106 may include one or more instruction modules. The instruction modules may include computer program modules. The instruction modules may include one or more of signal receiving module 108, value identifying module 110, object identifying module 112, manifestation manifesting module 114, user input receiving module 116, element determination module 118, manifestation removing module 120, signal transmittal module 122, signal generating module 124, information processing module 126, manifestation modification module 128, feedback generating module 130, and/or other instruction modules.

Signal receiving module 108 may be configured to receive, at a first physical object detector, a first signal, from a first physical object-associated element in a first physical environment. The first physical object-associated element may be associated with a first physical object in the first physical environment. Receiving the first signal may include receiving the first signal wirelessly. Receiving the first signal may include receiving the first signal from the first physical object-associated element without any physical contact between the first physical object detector and the first physical object-associated element. Receiving the first signal may include receiving the first signal from the first physical object-associated element with physical contact between the first physical object detector and the first physical object-associated element.

Receiving the first signal may include receiving the first signal automatically from the first physical object. Receiving the first signal automatically from the first physical object may include receiving the first signal without facilitation by a user.

Receiving the first signal may include receiving the first signal via an electromagnetic receiver means. The electromagnetic receiver means may include a radio receiver. The electromagnetic receiver means may include a radio frequency identification (RFID) tag transmission receiver means (e.g., an RFID tag transmitter). The electromagnetic receiver means may include a near-field communication (NFC) tag transmission receiver means (e.g., an NFC tag transmitter). The electromagnetic receiver means may include a Bluetooth transmission receiver means or a Bluetooth Low Energy (BLE) transmitter receiver means. The radio receiver may receive an electromagnetic signal, which may be transmitted by a radio transmitter. A transmitter may be a tag. A transmitter may be associated with a physical object-associated element, or with another element of an embodiment of a system of the invention.

Receiving the first signal may include receiving the first signal via an optical receiver means. The optical receiver means may include a camera. The optical receiver means may include one or more lenses. The optical receiver means may include a light sensor, or a multi-dimensional array of light sensors. The camera may be associated with a mobile communication device (such as a mobile phone), and may furthermore include one or more lenses. The first signal may include an optical signal. An optical signal may be communicated (e.g., transmitted) by a physical object, or by an image (such as an image that is printed on a physical object), or by other optical signal generating means. Such an optical signal may be received by an optical signal receiver means. An optical signal may actively generate light, and/or an optical signal may reflect otherwise generated or ambient light, in order to communicate an optical signal that is capable of being received by an optical signal receiver means.

Receiving the first signal may include receiving the first signal via an audio receiver means. The audio receiver means may include a microphone. An audio (or sound) signal may be communicated (e.g., transmitted) by a physical object. An audio signal may be a natural sound created, synthesized, or produced by the physical object, or otherwise communicated by the physical object. An audio signal may be communicated by a speaker or other sound generating means. An audio signal may be received by an audio signal receiver. An audio signal receiver may include a microphone, and/or another sensor that is capable of receiving an audio or sound signal and generating output based on the received audio or sound signal.

The first signal may include an electromagnetic signal. The first physical object detector may include an electromagnetic receiver means. The electromagnetic receiver means may include a radio receiver (e.g., a radio). The first physical object detector may include an optical receiver means. The optical receiver means may include a camera. The camera may include one or more lenses. The first physical object detector may include an audio receiver means. The audio receiver means may include a microphone. Other signal types and receiver means fall within the scope of embodiments of the present invention, including other signal types that use energy to communicate a signal.

A first mobile communication device may include the first physical object detector. A mobile communication device may be, for example and without limitation, a mobile phone (e.g., an Apple iPhone), a tablet computer (e.g., an Apple iPad), a laptop computer (e.g., an Apple MacBook Air), or a wearable computer (e.g., an Apple Watch).

The first physical object detector may be physically distinct from the first physical object-associated element. The first physical object detector may be physically distinct from the first physical object.

The first physical object-associated element may communicate a visual image. The visual image may provide the first signal. Receiving the first signal from the first physical object-associated element may include receiving the first signal from the first physical object-associated element using optical receiver means (e.g., to receive the visual image). The visual image may communicate the first signal to the first physical object detector. The first physical object detector may include optical receiver means. The visual image may include a QR code. The visual image may include a bar code. The visual image may include another type or form of visual code. The visual image may include at least one color. The visual image may include a black and white, single-color, and/or multi-color image. The visual image may be unique. The visual image may be non-unique, e.g., the visual image may represent a category.

The first physical object-associated element may include a wireless signal transmitter. The wireless signal transmitter may provide (e.g., communicate) the first signal. Receiving the first signal from the first physical object-associated element may include receiving the first signal wirelessly from the first physical object-associated element using wireless receiver means. The first physical object detector may include wireless receiver means. The wireless signal transmitter may wirelessly communicate the first signal to the first physical object detector. The wireless signal transmitter may include a near field communication (NFC) transmitter (tag). The wireless signal transmitter may include a radio frequency identification (RFID) transmitter (tag). A RFID transmitter tag may be passive. A RFID transmitter tag may be active. An NFC tag, RFID tag, or other similar tag may wirelessly (contactlessly) communicate a signal containing information, such as an identity of the tag, or an identity of a physical object with which the tag is associated.

The first physical object-associated element may include a sound generating means. The sound generator means may include a speaker. The sound generator means may be the same as the first physical object. The sound generator means may be the vocalization apparatus (e.g., vocal chords) of a person. A sound may include music or be musical. A sound may include a voice. A sound may include a sound produced by the first physical object. Receiving the first signal from the first physical object-associated element may include receiving the first signal from the first physical object-associated element using sound receiver means. The sound receiver means may include a microphone. The sound receiver means may include a sound amplifier. The sound receiver means may include an audio processing means. The first physical object detector means may include a sound receiver means. The sound generator means may communicate the first signal to the first physical object detector. The sound generator means may include a speaker. The words "sound" and "audio" are used interchangeably herein, e.g., sound receiver means has the same meaning as audio receiver means.

Determining that the first physical object-associated element is in proximity to the first physical object detector may include determining that the first physical object-associated element is in proximity to the first physical object detector based on the first signal. Determining that the first physical object-associated element is in proximity to the first physical object detector may include determining that the first physical object-associated element is in proximity to the first physical object detector in response to receiving the first signal. Determining that the first physical object-associated element is in proximity to the first physical object detector may include determining that the first physical object-associated element is in substantially the same place as the first physical object detector at substantially the same time. Receiving the first signal may be performed in response to determining that the first physical object-associated element is in proximity to the first physical object detector in the first physical environment. In various embodiments, a determination of proximity between a physical object-associated element and a physical object detector may be a proxy for a determination of proximity between the physical object and a user (such as a user of a mobile device or virtual environment output device that includes an object detector).

Identifying the first value associated with the first signal may be performed in response to determining that the first physical object-associated element is in proximity to the first physical object detector in the first physical environment. Identifying the first virtual object may be performed in response to determining that the first physical object-associated element is in proximity to the first physical object detector in the first physical environment. Manifesting the first manifestation of the first virtual object may be performed in response to determining that the first physical object-associated element is in proximity to the first physical object detector in the first physical environment. Determining that the first physical object-associated element is in proximity to the first physical object detector in the first physical environment may be performed in response to determining that the first physical object-associated element is in proximity to the first physical object detector in the first physical environment.

The system 100 may also include an element determination module 118, which may determine that the first physical object-associated element is in proximity to the first physical object detector in the first physical environment. Determining that the first physical object-associated element is in proximity to the first physical object detector in the first physical environment may include determining that the first physical object-associated element is in proximity to the first physical object detector in the first physical environment based on a presence of the first signal. Determining that the first physical object-associated element is in proximity to the first physical object detector in the first physical environment may include determining that the first physical object-associated element is in proximity to the first physical object detector based on the content of the first signal.

The element determination module 118 may, additionally or alternatively, determine that the first physical object-associated element is not in proximity to the first physical object detector in the first physical environment. For example, the element determination module 118 may, additional or alternatively, determine, based on the first signal, that the first physical object-associated element is not in proximity to the first physical object detector in the first physical environment.

Determining that the first physical object-associated element is not in proximity to the first physical object detector in the first physical environment may include determining that the first physical object-associated element is not in proximity to the first physical object detector based on an absence of the first signal. Determining that the first physical object-associated element is not in proximity to the first physical object detector in the first physical environment may include determining that the first physical object-associated element is not in proximity to the first physical object detector in the first physical environment in response to an absence of the first signal. Determining that the first physical object-associated element is not in proximity to the first physical object detector in the first physical environment may include determining that the first physical object-associated element is not in proximity to the first physical object detector in the first physical environment in response to not receiving the first signal. Determining that the first physical object-associated element is not in proximity to the first physical object detector in the first physical environment may include determining that the first physical object-associated element is not in proximity to the first physical object detector in the first physical environment based on a change in the first signal. Determining that the first physical object-associated element is not in proximity to the first physical object detector in the first physical environment may include determining that the first physical object-associated element is not in proximity to the first physical object detector in the first physical environment based on the content of the first signal. Determining that the first physical object-associated element is not in proximity to the first physical object detector in the first physical environment may include determining that the first physical object-associated element is not in proximity to the first physical object detector in the first physical environment based on the strength of the first signal. Determining that the first physical object-associated element is not in proximity to the first physical object detector in the first physical environment may include determining that the first physical object-associated element is not in proximity to the first physical object detector in the first physical environment based on determining that the first physical object-associated element is not in substantially the same location as the first physical object detector at substantially the same time. Determining that the first physical object-associated element is not in proximity to the first physical object detector in the first physical environment may include determining that the first physical object-associated element is not in proximity to the first physical object detector in the first physical environment based on a second signal. The second signal may not be the first signal, the second signal may be received from a second physical object-associated element that is associated with a second physical object, wherein the second physical object-associated element is not the first physical object-associated element, and wherein the second physical object is not the first physical object.

The first physical object may be a thing. By way of non-limiting example, the thing may be or include at least one of: an object, a personal object, a commercial object, an industrial object, a military object, an item of clothing, an item of footwear, a shoe, a sneaker, a mode of transportation, a bicycle, an automobile, an aircraft, a boat, a ship, a drone, a scooter, a machine, equipment, a food item, a tool, a resource, a supply, and an implement.

The first physical object may include a physical place. The physical place may include a residential setting. The physical place may include a commercial setting. The physical place may include an industrial setting. The physical place may include an outdoor setting. The physical place may include a natural setting. The first physical object may include a physical event. The physical event may include a performance. The physical event may include a concert. The physical event may include a meeting. The physical event may include a conference. The physical thing may include an experience.

The first physical object may include a physical person. The physical person may include a first user. The physical person may be a human. The physical person may be an animal. The first user may be a user of the first virtual environment output device. The first user may be someone who is not a user of the first virtual environment output device. The first physical object may be a user of a second physical object. The first physical object may be a user of a second virtual environment output device.

The first physical object may include the first physical object-associated element. The first physical object-associated element may be coupled to the first physical object. The first physical object-associated element may be the first object. The first object-associated element may be attached to a surface of the first physical object. The first physical object-associated element may be physically distinct from the first physical object. The first physical object-associated element may communicate a signal, including the first signal. The first physical object-associated element may communicate a signal by visual, light, audio, sound, radio, electromagnetic, wireless, or other signal communication or transmission means.

The first signal may contain information representing an identity of the first physical object. The first signal may contain information representing a code that is associated with an identity of the first physical object. The identity of the first physical object may be a unique identity of the first physical object, e.g., an identity that is different from the identity of all other physical objects within the physical world, or at least within a particular physical environment. The identity of the first physical object may be a non-unique identity of the first physical object, e.g., an identity that is not different from the identity of all other physical objects within the physical world, or at least within a particular physical environment. The non-unique identity of the first physical object may include a class. The first physical object may be an instance of the class.

Signal receiving module 108 may be configured to receive, at the first physical object detector, a second signal. Receiving the second signal may include receiving the second signal from the first physical object. Receiving the second signal may include transmitting the second signal from the first virtual environment output device to a computer (e.g., over a network to a remote computer). Receiving the second signal may include transmitting the second signal from a mobile communication device to the computer (e.g., over a network to a remote computer). Receiving the second signal may include transmitting the second signal from a sensor device to a computer (e.g., over a network to a remote computer).

The sensor device may include a physiologic sensor. A physiologic sensor may sense a first physiologic parameter of a person, such as a user. The first physiologic parameter may be a heart rate, respiration rate, blood pressure, or any other physiologic parameter that may be sensed or measured. A sensed or measured physiologic parameter may have a corresponding value, such as a numeric representation of the number of heartbeats per minute of a person whose physiology is being measured. The physiologic sensor may include, for example, an electrical detector, sound detector (e.g., a microphone), light detector (e.g., camera or other optical sensor means). One or more sensed physiologic parameter values may be communicated to other elements of a system of the invention, and may be processed, analyzed, transformed, and outputted.

Signal receiving module 108 may be configured to receive, at the remote computer, the second signal. The second signal may be based on the first signal. The second signal may be based on the first value. The second signal may be based on the first virtual object.

Value identifying module 110 may be configured to identify, at a first value identification module, based on the first signal, a first value associated with the first signal. The first signal may contain information representing the first value. Identifying the first value may include deriving the first value from the first signal. Deriving the first value from the first signal may include performing an analysis on the first signal to identify the first value. Identifying the first value may include using the first signal to look up the first value in a library.

Identifying the first value may include applying a model to the first signal to identify the first value. The model may include a neural network. Identifying the first value may include applying a rule to the first signal to identify the first value. Identifying the first value may include applying machine learning or artificial intelligence to the first signal to identify the first value. Identifying the first value may be performed based on receiving the first signal. Identifying the first value may be performed in response to receiving the first signal. The first value may represent an identity of the first physical object. The identity of the first physical object may be unique or not unique.

The identity of the first physical object may include a commercial identity of the first physical object. A commercial identity of a physical object may be a brand of the physical object. A commercial identity of a physical object may be a product type of the physical object. A commercial identity of a physical object may be a trademarked or trademarkable aspect of the physical object. The identity of the first physical object may include a unique identity of the first physical object. A unique identity of a physical object may indicate that the particular physical object is the only (sole) instance of that physical object that exists in the known physical world (e.g., an original Picasso painting). The identity of the first physical object may include a non-unique identity of the first physical object. A non-unique identity of a physical object may indicate that a particular physical object is one of multiple copies of that physical object that exists in the known physical world (e.g., a specific model of a product of which thousands are made every year). A non-unique identity of the first physical object may be a class, wherein the first physical object is a representative member (or instance) of the class. A class may be a brand. A non-unique identity of the first physical object may be a category, wherein the first physical object is a representative member (or instance) of the category.

The first value may include a value of a first parameter. The first parameter may include a first characteristic of the first physical object. A characteristic of a physical object may be a feature, attribute or element of the physical object. The first value may represent an identifier (that represents an identity) of the first physical object. The first value may be associated with the first physical object. The first parameter may include a first characteristic of the first physical environment. A characteristic of a physical environment may be a feature, attribute or element of the physical environment. The first parameter may include a first characteristic of a first user of the first virtual environment output device. A characteristic of a user may be a feature, attribute or behavior of the user. The first characteristic of the first user of the first virtual output device may include a language being spoken by the first user. The first characteristic of the first user of the first virtual output device may be a physiologic measurement of the first user. Non-limiting examples of a physiologic measurement include: heart rate, respiration rate, blood pressure, cortisol level, glucose level, stress level, and more.

Value identifying module 110 may be configured to identify, at the first value identification module, based on the second signal, a second value. The second value may represent a property of the first physical object other than the identifier of the first physical object. The second signal may be received from a second physical object. The second physical object may be distinct from the first physical object. The second value may include a location of the second physical object. The second physical object may include a computing device. The second value may include an identifier of the computing device. The second value may include an identifier of an application executing on the computing device. The second physical object may include a user of the first physical object. The second value may include an identifier of the user of the first physical object. The second value may include a physiologic measurement of the user of the first physical object. The second value may represent a state of a user of the second physical object. The state of the user of the second physical object may include an emotional state of the user of the second physical object. The method may include receiving the first signal at a first time, and receiving the second signal at a second time that is later than (after) the first time. The method may include a first value that represents a first value of a first parameter of the first physical object at the first time, and a second value that represents a second value of the first parameter of the first physical object at a second time.

Object identifying module 112 may be or include a first virtual object identification module. The first virtual object identification module may be configured to identify, based on the first value, a first virtual object and/or a first virtual entity represented by a first virtual object.

Identifying the first virtual object may include selecting the first virtual object from a library of virtual objects. Identifying the first virtual object may include generating the first virtual object. Identifying the first virtual object may include selecting an existing virtual object in the first virtual environment as the first virtual object. Identifying the first virtual object may include modifying an existing virtual object in the first virtual environment. Identifying the first virtual object may include replacing an existing virtual object in the first virtual environment with the first virtual object. Identifying the first virtual object may include replicating an existing virtual object in the first virtual environment. Identifying the first virtual object may include removing an existing virtual object from the first virtual environment. The first virtual object may have the first value. The first virtual object may not have the first value.

Identifying the first virtual entity may include selecting the first virtual entity from a library of virtual entities. Identifying the first virtual entity may include generating the first virtual entity. Identifying the first virtual entity may include selecting an existing virtual entity in the first virtual environment as the first virtual entity. Identifying the first virtual entity may include modifying an existing virtual entity in the first virtual environment. Identifying the first virtual entity may include replacing an existing virtual entity in the first virtual environment with the first virtual entity. Identifying the first virtual entity may include replicating an existing virtual entity in the first virtual environment. Identifying the first virtual entity may include removing an existing virtual entity from the first virtual environment. The first virtual entity may have the first value. The first virtual entity may not have the first value.

Identifying the first virtual object may be performed based on receiving the first signal. Identifying the first virtual object may be performed in response to receiving the first signal. Identifying the first virtual object may be performed based on information contained in (or communicated by) the first signal.

Identifying the first virtual entity may be performed based on receiving the first signal. Identifying the first virtual entity may be performed in response to receiving the first signal. Identifying the first virtual entity may be performed based on information contained in (or communicated by) the first signal.

Identifying the first virtual object may be performed based on identifying the first value. Identifying the first virtual object may be performed in response to identifying the first value. Identifying the first virtual object may be performed based on information contained in (or communicated by) the first value.

Identifying the first virtual entity may be performed based on identifying the first value. Identifying the first virtual entity may be performed in response to identifying the first value. Identifying the first virtual entity may be performed based on information contained in (or communicated by) the first value.

The first virtual object may be or include a first simulation of the first physical object. The first virtual object may be or include a first representation of the first physical object. A virtual object may be or include a simulation or representation of a physical person, a physical living organism, a physical place, a physical setting, a physical location, a physical thing, a physical object, and an item made of physical atoms.

The first virtual object may simulate or represent a physical thing. The first virtual object may be a simulation or representation of a physical thing. By way of non-limiting example, the physical thing (that the virtual object simulates or represents) may be or include at least one of: an object, a personal object, a commercial object, a industrial object, a military object, a clothing item, a item of footwear, a shoe, a sneaker, a mode of transportation, a bicycle, an automobile, an aircraft, a boat, a ship, a drone, a scooter, a machine, equipment, a food item, a tool, a resource, a supply, a book, furniture, a furnishing, and an implement.

The first virtual object may simulate or represent a physical place or location. The first virtual object may be a simulation or representation of a physical place or location. The place or location may be a residential setting, such as a home. The place or location may be a commercial setting. The place or location may be an industrial setting. The place or location may be an outdoor setting, such as a natural setting.

The first virtual object may simulate or represent a physical person or living organism. The first virtual object may be a simulation or representation of a physical person or living organism. The person or living organism may be a first user. The person or living organism may be a user of the first physical object. The person or living organism may be a user of a second physical object (e.g., that is distinct from the first physical object, that is not the first physical object). The person or living organism may be a user of the first virtual environment output device. The person or living organism may be someone who is not a user of the first virtual environment output device (other than the first user of the first virtual environment output device). The person or living organism may be a user of a second virtual environment output device.

The first virtual object may simulate or represent a virtual experience or event. The first virtual object may be a simulation or representation of a virtual experience or event. The virtual experience or event may be a performance. The virtual experience or event may be a concert. The virtual experience or event may be a meeting. The virtual experience or event may be a conference. The virtual experience or event may be or include a simulation or representation of an experience or event in the physical environment.

The first virtual object may have a first virtual characteristic that simulates a first physical characteristic of the first physical object. The first virtual object may have a first virtual characteristic that represents a first physical characteristic of the first physical object.

The first virtual object may include a subset of the first virtual environment. The first virtual object may include a subset of a second virtual object in the virtual environment. The first virtual object may include a non-fungible token. The first virtual object may include digital content. The first virtual object may include a first simulation of a second physical object. The second physical object may have a characteristic in common with the first physical object. The second physical object may relate to the first physical object. The second physical object may complement the first physical object. The second physical object may commercially compete with the first physical object.

The first virtual object may represent a first virtual entity that includes a subset of a virtual space represented by the first virtual environment. The first virtual entity may include a subset of a second virtual entity in the virtual space. The first virtual entity may include a non-fungible token. The first virtual entity may include digital content. The first virtual entity may include a first simulation of a second physical object. The second physical object may have a characteristic in common with the first physical object. The second physical object may relate to the first physical object. The second physical object may complement the first physical object. The second physical object may commercially compete with the first physical object.

Manifestation manifesting module 114 may be configured to manifest, at a first virtual environment output device, a first manifestation of the first virtual object in a first manifestation of the first virtual environment. The first virtual environment output device may be the same as or include the first physical object detector. The first physical object detector may be distinct from the first virtual environment output device. The first virtual environment output device may be the same as or include the first physical object detector. The first virtual environment output device may be coupled to the first physical object detector.

The first user may be a user of the first virtual environment output device. Manifesting the first manifestation of the first virtual object in the first virtual environment may include generating first visual output representing the first virtual object. In some embodiments, the first virtual object may represent or simulate a physical object, such as a physical object that exists, or could exist, in the physical environment. In some embodiments, the first virtual object may be, for example, text, audio, or video output, or a combination of these. Manifesting such first visual output may include, for example, generating the first visual output in two dimensions within a three-dimensional manifestation of the first virtual environment. As a particular example, the first manifestation of the first virtual object may be a two-dimensional video displayed within a three-dimensional manifestation of the first virtual environment. As another particular example, the first manifestation of the first virtual object may be a three-dimensional video displayed within a three-dimensional manifestation of the first virtual environment. Such a two-dimensional video or three-dimensional video may, for example, include user interface controls. Such user interface controls may include one or more of a play button, a stop button, a pause button, a rewind button, a fast forward button, an enlarge button, and a hide button, which the first user may indicate, select or otherwise interact with to cause the corresponding functions to be performed. Such first user indication, selection, or other interaction may be performed by the first user, and sensed by the system 100, using any of a variety of means, including, but not limited to, a manual manipulation by the first user using an interactive feature (e.g., a button, a joystick, a body motion sensor, a touch sensor) of the system 100. Embodiments may use eye tracking and an eye movement sensor, body movement and a body movement sensor, voice or sound produced by a user and a microphone, and more.

Manifesting the first manifestation of the first virtual object may include generating auditory output representing the first virtual object. Manifesting the first manifestation of the first virtual object may include generating tactile output representing the first virtual object. Manifesting the first manifestation of the first virtual object may include generating haptic output representing the first virtual object. Manifesting the first manifestation of the first virtual object may include generating proprioceptive output representing the first virtual object.

Manifesting the first manifestation of the first virtual object may include generating olfactory output representing the first virtual object. Manifesting the first manifestation of the first virtual object may include manifesting a plurality of manifestations of the first virtual object using one or a plurality of output devices. Manifesting the first manifestation of the first virtual object may be performed based on identifying the first value. Manifesting the first manifestation of the first virtual object may be performed in response to identifying the first value. Manifesting the first manifestation of the first virtual object may be performed based on identifying the first virtual object. Manifesting the first manifestation of the first virtual object may be performed in response to identifying the first virtual object.

Regardless of the form that the first manifestation of the first virtual object takes, the user input receiving module 116 may receive, from the first user, first user input that is directed to the first manifestation of the first virtual object. The first user input may take any of the forms disclosed herein, such as one or more of the following, in any combination: one or more body or body part movements of the first user (e.g., one or more movements of the first user's hands and/or eyes), text or typed input received from the first user, audio (e.g., voice or sound) input received from the first user, absolute or relative positional/directional input received from the first user (e.g., via a mouse and/or trackpad), and proximity input (e.g., repositioning or being in proximity with a particular physical object in the physical environment, or location). Regardless of the form that the first user input takes, the first user input may, for example, cause an avatar of the first user in the first virtual environment to indicated, select, point to, look at, touch, grasp, move, or otherwise interact with (directly or indirectly) the first manifestation of the first virtual object. For example, the first user input may include movement input (e.g., movement of the first user's arms, hands, head, and/or eyes) which selects the first manifestation of the first virtual object, such as by causing an avatar of the first user in the first virtual environment to select, point to, look at, touch, grasp, move, or otherwise interact with the first manifestation of the first virtual object. As another example, the first user input may be a simple indication or selection of an interactive feature in the virtual environment, e.g., indicating or selecting a button or choice of options presented to the first user in the virtual environment.

In response to receiving the first user input, the system 100 may perform any of a variety of actions, such as performing one or more actions in connection with the first virtual object and/or the first manifestation of the first virtual object. Such actions include, for example, modifying the first virtual object and/or modifying the first manifestation of the first virtual object. For example, such an action may include modifying a characteristic (e.g., size, shape, and/or location) of the first virtual object, and modifying the first manifestation of the first virtual object within the first manifestation of the first virtual environment to reflect the modified characteristic of the first virtual object, and presenting a new virtual object (other than the first virtual object). As a particular example, if the first virtual object includes digital content (e.g., text, audio and/or video content), such an action may include performing an action in connection with the digital content, such as playing, pausing, stopping, rewinding, fast forwarding, hiding or enlarging the video content, and modifying the first manifestation of the first virtual object to reflect such playing, pausing, stopping, rewinding, fast forwarding, hiding or enlarging.

In one embodiment, a first user may be presented with a first virtual object in a first virtual environment, based on the first user being in proximity with a particular physical object in the physical environment. In another embodiment, a first user may be presented with a first virtual object in a first virtual environment, in response to the first user being in proximity with a particular physical object in the physical environment. In either example, a first virtual object may represent or simulate a physical thing, such as a physical object that exists (or could exist) in the physical environment. As another example, a first virtual object may be first digital content, such as text, audio or video content (or a representation or indication that such content is available to the first user) in the first virtual environment. Such first digital content in the first virtual environment may relate to a physical object that the first user is (or was) in proximity within the physical environment. For example, such first digital content may be a video that offers or provides instructions, directions, use case examples, promotions or other information relating to the particular physical object in the physical environment that the first user is (or was) in proximity with. A video may show a first user how to operate a physical object, for example. An audio may present a music or sound file useful or enjoyable during use of a physical object, as another example. A text or other visual content may present a user with a promotion or other commercial opportunity (e.g., coupon, store opening, product trial), and possibly directions as to how the user may take advantage of such commercial opportunity, as yet another example. Such first digital content may be presented (or otherwise made available to) the first user at the time of first proximity between the first user and the physical object in the physical environment, or at a later time (e.g., after an elapsed time, or based on or in response to a future event, such as an indication or selection by the first user, or proximity between the first user and the same or another physical object in the physical environment at a second time).

Manifesting the first manifestation of the first virtual object may be performed based on receiving input from a user. Manifesting the first manifestation of the first virtual object may be performed in response to receiving input from a user. Manifesting the first manifestation of the first virtual object may include delaying by an amount of time before manifesting the first manifestation of the first virtual object. The first virtual environment output device may include a visual output means. The first virtual environment output device may include an image projector. The first virtual environment output device may include a hologram generator.

The first virtual environment output device may include an audio output means. The first virtual environment output device may include a tactile output means. The first virtual environment output device may include a haptic output means. The first virtual environment output device may include a proprioceptive output means. The first virtual environment output device may include an olfactory output means. The first virtual environment output device may include a virtual reality output means.

The first virtual environment output device may include a mixed reality output device. The first virtual environment output device may include an augmented reality output device. The first user may be a user of the first virtual environment output device. The first user may be not a user of the first virtual environment output device. The first virtual environment output device and the first physical object detector may be distinct from each other. The first virtual environment output device may be coupled to the first physical object detector.

The first virtual environment output device and the first virtual object generator may be distinct from each other. The first virtual environment output device may be coupled to the first virtual object generator. The first virtual environment output device may perform the identifying of the first value. The first virtual environment output device may perform the identifying of the first virtual object.

Manifesting the first manifestation of the first virtual object may include manifesting the first manifestation of the first virtual object in response to determining that the first physical object-associated element is in proximity to the first physical object detector in the first physical environment and that a condition has been satisfied. A condition may include a temporal condition. The condition may include a duration condition. The condition may include an event-based condition. The condition may include an identity-based condition. The condition may include a user permission-based condition. The condition may include a device identity-based condition. The condition may include a software application identity-based condition. The condition may include a proximity-based condition. A proximity-based condition may include a determination of proximity of the first physical object-associated element to a second physical object in the first physical environment.

Manifesting the first manifestation of the first virtual object may include manifesting the first manifestation of the first virtual object in response to determining that a condition has been satisfied. The condition may include a temporal condition. The condition may include a duration condition. The condition may include an event-based condition. The condition may include an identity-based condition. The condition may include a user permission-based condition. The condition may include a device identity-based condition. The condition may include a software application identity-based condition. The condition may include a proximity-based condition. A proximity-based condition may include a determination of proximity of the first physical object-associated element to a second physical object in the first physical environment.

In at least some embodiments of the present invention, the condition may be a payment-based condition. For example, following a determination of proximity, such as between a first physical object-associated element (that is associated with a first physical object) and a first physical object detector (that is associated with a first device used by a first user), the first user may be prompted to make or approve a payment of money (e.g., perform a financial transaction) using the first device. Such a payment may satisfy a condition, and the satisfaction of the condition may be determined by systems and/or methods of the present invention. A payment may be for the purchase of a first virtual object, rental of a first virtual object, or a subscription to use a first virtual object, as examples. A third-party payment processing service or method may be used, and may communicate a signal to the first user's first device, or to a remote computer, in order to provide information that the payment condition has been satisfied and the virtual object may be made available in the first virtual environment, for example. In at least some embodiments of the present invention, such a method may enable a first user to interact with a first physical object in a physical environment (e.g., in a store, in an office, in an industrial setting), perform a financial transaction (e.g., make or approve of a payment of money from the first user to a third party), and subsequently receive access to a first virtual object in a first virtual environment. In this use case the first virtual object may simulate the first physical object, for example.

The system 100 may also include manifestation removing module 120, which may remove the first manifestation of the first virtual object from the first manifestation of the first virtual environment. Removing the first manifestation of the first virtual object from the first manifestation of the first virtual environment may include removing the first manifestation of the first virtual object based on the determination that the first physical object-associated element is not in proximity to the first physical object detector in the first physical environment. Removing the first manifestation of the first virtual object from the first manifestation of the first virtual environment may include removing the first manifestation of the first virtual object based on the determination that the first physical object-associated element is not in proximity to the first physical object detector in the first physical environment. Removing the first manifestation of the first virtual object from the first manifestation of the first virtual environment may include removing the first manifestation of the first virtual object in response to the determination that the first physical object-associated element is not in proximity to the first physical object detector in the first physical environment.

Manifestation manifesting module 114 may be configured to manifest a second manifestation of a second virtual object in the first virtual environment before manifesting the first manifestation of the first virtual object.

Manifestation manifesting module 114 may be configured to, based on the determination that the first physical object-associated element is not in proximity to the first physical object detector, manifest, at the first virtual environment output device, a second manifestation of the first virtual object in the first manifestation of the first virtual environment. The second manifestation of the first virtual object may differ from the first manifestation of the first virtual object. Manifesting the second manifestation of the first virtual object may include manifesting the second manifestation of the first virtual object in response to the determination that the first physical object-associated element is not in proximity to the first physical object detector in the first physical environment.

User input receiving module 116 may be configured to receive first user input in response to the manifestation of the second virtual object. Manifesting the first manifestation of the first virtual object may include manifesting the first manifestation of the first virtual object in response to the first user input. Manifesting the first manifestation of the first virtual object may include manifesting the first manifestation of the first virtual object based on the first user input. The first virtual environment output device may perform the receiving of the first signal.

Element determination module 118 may be configured to determine that the first physical object-associated element is in proximity to the first physical object detector in the first physical environment.

Element determination module 118 may be configured to determine, based on the first signal, that the first physical object-associated element is not in proximity to the first physical object detector in the first physical environment.

Element determination module 118 may be configured to determine that the first physical object-associated element is not in proximity to the first physical object detector in the first physical environment.

Manifestation removing module 120 may be configured to, based on the determination that the first physical object-associated element is not in proximity to the first physical object detector, remove the first manifestation of the first virtual object from the first manifestation of the first virtual environment.

Manifestation removing module 120 may be configured to, based on the determination that the first physical object-associated element is not in proximity to the first physical object detector, remove the first manifestation of the first virtual object from the first manifestation of the first virtual environment. Manifestation removing module 120 may be configured to, in response to the determination that the first physical object-associated element is not in proximity to the first physical object detector, remove the first manifestation of the first virtual object from the first manifestation of the first virtual environment.

Signal transmittal module 122 may be configured to transmit a second signal, based on the first signal, to a remote computer over a first network. The second signal may be based on the first signal. The second signal may be transmitted based on the first signal. The second signal may be transmitted in response to the first signal. The remote computer may perform the identifying, based on the first signal, of the first value associated with the first signal. The remote computer may be physically distinct from the first physical object detector. The remote computer may be physically distinct from the first value identification module. The remote computer may be physically distinct from the first virtual object identification module. The remote computer may be physically distinct from the first virtual environment output device. The remote computer may be physically distinct from the first physical object detector and the first virtual environment output device. By way of non-limiting example, the remote computer may include a processor that is not included in the first physical object detector, or the first virtual environment output device. By way of non-limiting example, the remote computer may include a computer-readable medium that is not included in the first physical object detector, or the first virtual environment output device.

The first network may include a direct cable connection. Transmitting the second signal to the remote computer over the first network may include transmitting the second signal to the remote computer over the direct cable connection.

The first network may include a local area network. Transmitting the second signal to the remote computer over the first network may include transmitting the second signal to the remote computer over the local area network.

The first network may include a wide area network. Transmitting the second signal to the remote computer over the first network may include transmitting the second signal to the remote computer over the wide area network.

The first network may include the Internet. Transmitting the second signal to the remote computer over the first network may include transmitting the second signal to the remote computer over the Internet.

The first network may include a wireless network. Transmitting the second signal to the remote computer over the first network may include transmitting the second signal to the remote computer over the wireless network.

The first network may include a Bluetooth network. Transmitting the second signal to the remote computer over the first network may include transmitting the second signal to the remote computer over the Bluetooth network.

The first network may include a mesh network. Transmitting the second signal to the remote computer over the first network may include transmitting the second signal to the remote computer over the mesh network.

Signal transmittal module 122 may be configured to, at the remote computer, transmit a third signal over a second network. The second network may include a direct cable connection. Transmitting the third signal over the second network may include transmitting the third signal over the direct cable connection. The second network may include a local area network. Transmitting the third signal over the second network may include transmitting the third signal over the local area network. The second network may include a wide area network. Transmitting the third signal over the second network may include transmitting the third signal over the wide area network. The second network may include the Internet. Transmitting the third signal over the second network may include transmitting the third signal over the Internet. The second network may include a wireless network. Transmitting the third signal over the second network may include transmitting the third signal over the wireless network. The second network may include a Bluetooth network. Transmitting the third signal over the second network may include transmitting the third signal over the Bluetooth network. The second network may include a mesh network. Transmitting the third signal over the second network may include transmitting the third signal over the mesh network.

Transmitting the third signal may include transmitting the third signal to the first virtual environment output device. Transmitting the third signal may include transmitting the third signal to a mobile communication device.

Transmitting the third signal may include transmitting the third signal to a computing device other than the remote computer.

Signal receiving module 108 may be configured to, at the first virtual environment output device, receive the third signal.

Manifestation manifesting module 114 may be configured to, at the first virtual environment output device, manifest a manifestation of a second virtual object in the first manifestation of the first virtual environment based on the third signal.

Manifestation manifesting module 114 may be configured to, at the first virtual environment output device, manifest a second manifestation of the first virtual object in the first manifestation of the first virtual environment based on the third signal. The first virtual environment output device may perform the manifesting of the first virtual object. Manifesting the second manifestation may include manifesting the second manifestation of the first virtual object based on the determination that the first physical object-associated element is not in proximity to the first physical object detector in the first physical environment. Manifesting the second manifestation may include manifesting the second manifestation of the first virtual object in response to the determination that the first physical object-associated element is not in proximity to the first physical object detector in the first physical environment. Manifesting the second manifestation may include removing the first manifestation of the first virtual object based on the determination that the first physical object-associated element is not in proximity to the first physical object detector in the first physical environment. Manifesting the second manifestation may include removing the first manifestation of the first virtual object in response to the determination that the first physical object-associated element is not in proximity to the first physical object detector in the first physical environment.

Signal generating module 124 may be configured to generate the second signal based on the first physiologic output.

Information processing module 126 may be configured to, at the remote computer, process information. Processing the information may include identifying the first value based on the second signal. Processing the information may include identifying the first virtual object based on the second signal. Processing the information may include processing information based on the second signal. Processing the information may include processing information contained in the second signal. Processing the information may include analyzing the information. Processing the information may include applying a rule to the information. Processing the information may include applying a model to the information. Processing the information may include using a neural network, machine learning, or artificial intelligence.

Manifestation modification module 128 may be configured to, at the first virtual environment output device, modify the first manifestation of the first virtual object in the first manifestation of the first virtual environment based on the third signal.

Feedback generating module 130 may be configured to, at the first virtual environment output device, generate feedback based on the third signal. Generating the feedback based on the third signal may include providing the feedback as output to a user of the first virtual environment output device. Generating the feedback based on the third signal may include providing the feedback as output to the remote computer. Generating the feedback based on the third signal may include providing the feedback as output to a computing device other than the remote computer. Generating the feedback based on the third signal may include providing the feedback as output to a mobile communication device.

In some embodiments, the signal may include a radio signal. In some embodiments, by way of non-limiting example, the digital content may include at least one of text, audio, and video. In some embodiments, the first virtual environment may include a virtual reality environment. In some embodiments, the first virtual environment may include a mixed reality environment. In some embodiments, the first virtual environment may include an augmented reality environment.

In some embodiments, the first virtual environment may include a simulation of a second physical environment. In some embodiments, the first virtual environment may include a fictional environment. In some embodiments, the first virtual environment may be governed by a set of virtual laws of physics that differ from a set of natural laws of physics. In some embodiments, the first virtual environment may include a first avatar corresponding to a first user. In some embodiments, the first virtual environment may include a first avatar corresponding to a first user. In some embodiments, by way of non-limiting example, the first virtual environment may include a first avatar corresponding to a first user, and a second avatar corresponding to a second user. The second physical environment may include the first physical environment.

In some embodiments, the first user and the second user are distinct.

In some embodiments, computing platform(s) 102, remote platform(s) 104, and/or external resources 132 may be operatively linked via one or more electronic communication links. For example, such electronic communication links may be established, at least in part, via a network such as the Internet and/or other networks. It will be appreciated that this is not intended to be limiting, and that the scope of this disclosure includes embodiments in which computing platform(s) 102, remote platform(s) 104, and/or external resources 132 may be operatively linked via some other communication media.

A given remote platform 104 may include one or more processors configured to execute computer program modules. The computer program modules may be configured to enable an expert or user associated with the given remote platform 104 to interface with system 100 and/or external resources 132, and/or provide other functionality attributed herein to remote platform(s) 104. By way of non-limiting example, a given remote platform 104 and/or a given computing platform 102 may include one or more of a server, a desktop computer, a laptop computer, a handheld computer, a tablet computing platform, a NetBook, a Smartphone, a gaming console, and/or other computing platforms.

External resources 132 may include sources of information outside of system 100, external entities participating with system 100, and/or other resources. In some embodiments, some or all of the functionality attributed herein to external resources 132 may be provided by resources included in system 100.

Computing platform(s) 102 may include electronic storage 134, one or more processors 136, and/or other components. Computing platform(s) 102 may include communication lines, or ports to enable the exchange of information with a network and/or other computing platforms. Illustration of computing platform(s) 102 in FIG. 1 is not intended to be limiting. Computing platform(s) 102 may include a plurality of hardware, software, and/or firmware components operating together to provide the functionality attributed herein to computing platform(s) 102. For example, computing platform(s) 102 may be implemented by a cloud of computing platforms operating together as computing platform(s) 102.

Electronic storage 134 may comprise non-transitory storage media that electronically stores information. The electronic storage media of electronic storage 134 may include one or both of system storage that is provided integrally (i.e., substantially non-removable) with computing platform(s) 102 and/or removable storage that is removably connectable to computing platform(s) 102 via, for example, a port (e.g., a USB port, a firewire port, etc.) or a drive (e.g., a disk drive, etc.). Electronic storage 134 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 134 may include one or more virtual storage resources (e.g., cloud storage, a virtual private network, and/or other virtual storage resources). Electronic storage 134 may store software algorithms, information determined by processor(s) 136, information received from computing platform(s) 102, information received from remote platform(s) 104, and/or other information that enables computing platform(s) 102 to function as described herein.

Processor(s) 136 may be configured to provide information processing capabilities in computing platform(s) 102. As such, processor(s) 136 may include one or more of a digital processor, an analog processor, a digital circuit designed to process information, an analog circuit designed to process information, a state machine, and/or other mechanisms for electronically processing information. Although processor(s) 136 is shown in FIG. 1 as a single entity, this is for illustrative purposes only. In some embodiments, processor(s) 136 may include a plurality of processing units. These processing units may be physically located within the same device, or processor(s) 136 may represent processing functionality of a plurality of devices operating in coordination. Processor(s) 136 may be configured to execute modules 108, 110, 112, 114, 116, 118, 120, 122, 124, 126, 128, and/or 130, and/or other modules. Processor(s) 136 may be configured to execute modules 108, 110, 112, 114, 116, 118, 120, 122, 124, 126, 128, and/or 130, and/or other modules by software; hardware; firmware; some combination of software, hardware, and/or firmware; and/or other mechanisms for configuring processing capabilities on processor(s) 136. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 108, 110, 112, 114, 116, 118, 120, 122, 124, 126, 128, and/or 130 are illustrated in FIG. 1 as being implemented within a single processing unit, In at least some embodiments in which processor(s) 136 includes multiple processing units, one or more of modules 108, 110, 112, 114, 116, 118, 120, 122, 124, 126, 128, and/or 130 may be implemented remotely from the other modules. The description of the functionality provided by the different modules 108, 110, 112, 114, 116, 118, 120, 122, 124, 126, 128, and/or 130 described below is for illustrative purposes, and is not intended to be limiting, as any of modules 108, 110, 112, 114, 116, 118, 120, 122, 124, 126, 128, and/or 130 may provide more or less functionality than is described. For example, one or more of modules 108, 110, 112, 114, 116, 118, 120, 122, 124, 126, 128, and/or 130 may be eliminated, and some or all of its functionality may be provided by other ones of modules 108, 110, 112, 114, 116, 118, 120, 122, 124, 126, 128, and/or 130. As another example, processor(s) 136 may be configured to execute one or more additional modules that may perform some or all of the functionality attributed below to one of modules 108, 110, 112, 114, 116, 118, 120, 122, 124, 126, 128, and/or 130.

FIGS. 2A, 2B, 2C, 2D, 2E, 2F, 2G, 2H, 2I, 2J, 2K, 2L, 2M, 2N, 2O, 2P, 2Q, 2R, 2S, 2T, and/or 2U illustrates a method 200 for manifesting a virtual object in a virtual environment, in accordance with one or more embodiments. The operations of method 200 presented below are intended to be illustrative. In some embodiments, method 200 may be accomplished with one or more additional operations not described, and/or without one or more of the operations discussed. Additionally, the order in which the operations of method 200 are illustrated in FIGS. 2A, 2B, 2C, 2D, 2E, 2F, 2G, 2H, 2I, 2J, 2K, 2L, 2M, 2N, 2O, 2P, 2Q, 2R, 2S, 2T, and/or 2U and described below is not intended to be limiting.

In some embodiments, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

Figure 2A:
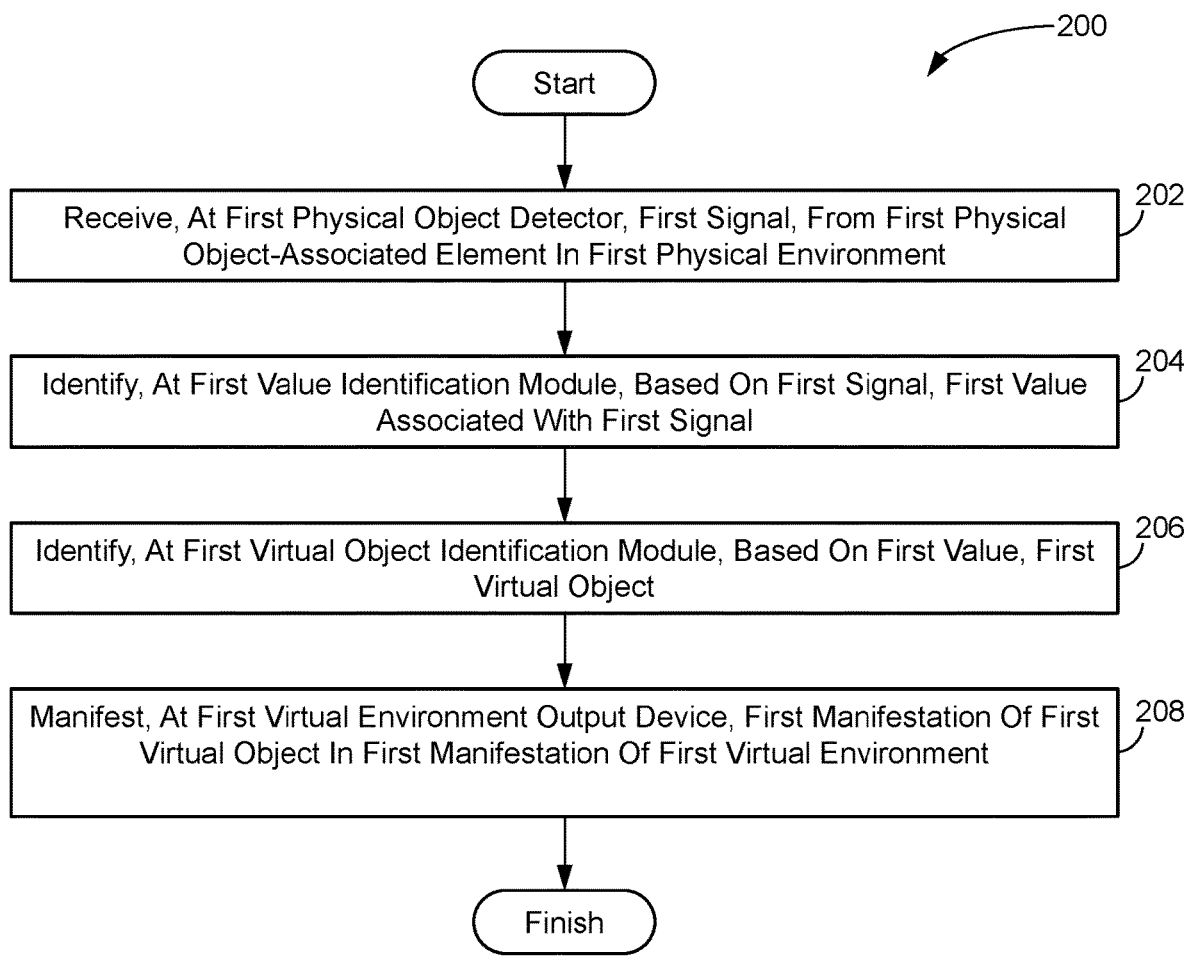
FIGS. 2A-2U illustrate methods for manifesting a virtual object in a virtual environment, in accordance with one or more embodiments of the invention.

FIG. 2A illustrates method 200, in accordance with one or more embodiments.

An operation 202 may include receiving, at a first physical object detector, a first signal, from a first physical object-associated element in a first physical environment. The first physical object-associated element may be associated with a first physical object in the first physical environment. Operation 202 may be performed by one or more hardware processors configured by machine-readable instructions including a module that is the same as or similar to signal receiving module 108, in accordance with one or more embodiments.

An operation 204 may include identifying, at a first value identification module, based on the first signal, a first value associated with the first signal. The first value may be associated with the first physical object. Operation 204 may be performed by one or more hardware processors configured by machine-readable instructions including a module that is the same as or similar to value identifying module 110, in accordance with one or more embodiments.

An operation 206 may include identifying, at a first virtual object identification module, based on the first value, a first virtual object. Operation 206 may be performed by one or more hardware processors configured by machine-readable instructions including a module that is the same as or similar to object identifying module 112, in accordance with one or more embodiments.

An operation 208 may include manifesting, at a first virtual environment output device, a first manifestation of the first virtual object in a first manifestation of the first virtual environment. Operation 208 may be performed by one or more hardware processors configured by machine-readable instructions including a module that is the same as or similar to manifestation manifesting module 114, in accordance with one or more embodiments.

Figure 2B:
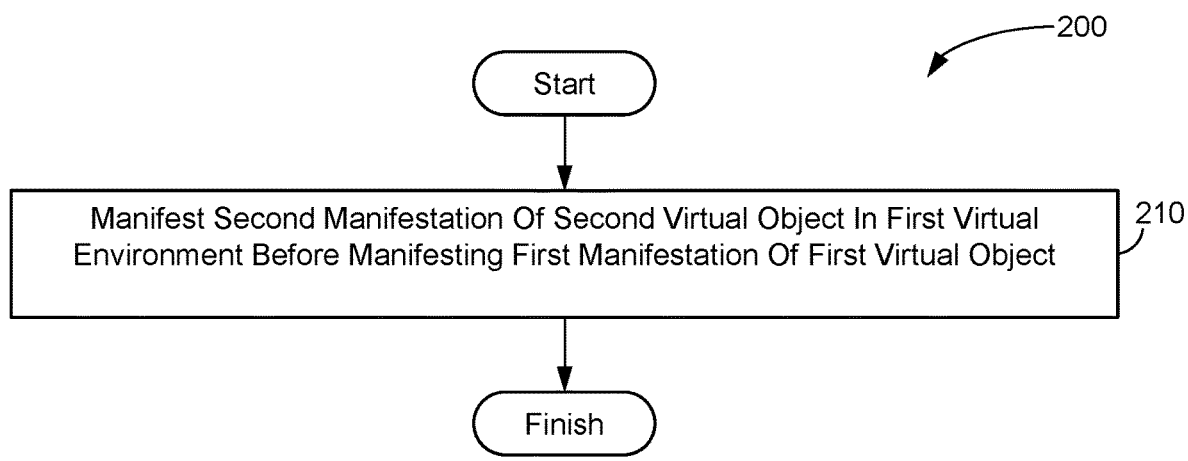

FIG. 2B illustrates method 200, in accordance with one or more embodiments.

An operation 210 may include further including manifesting a second manifestation of a second virtual object in the first virtual environment before manifesting the first manifestation of the first virtual object. Operation 210 may be performed by one or more hardware processors configured by machine-readable instructions including a module that is the same as or similar to manifestation module 114, in accordance with one or more embodiments.

Figure 2C:
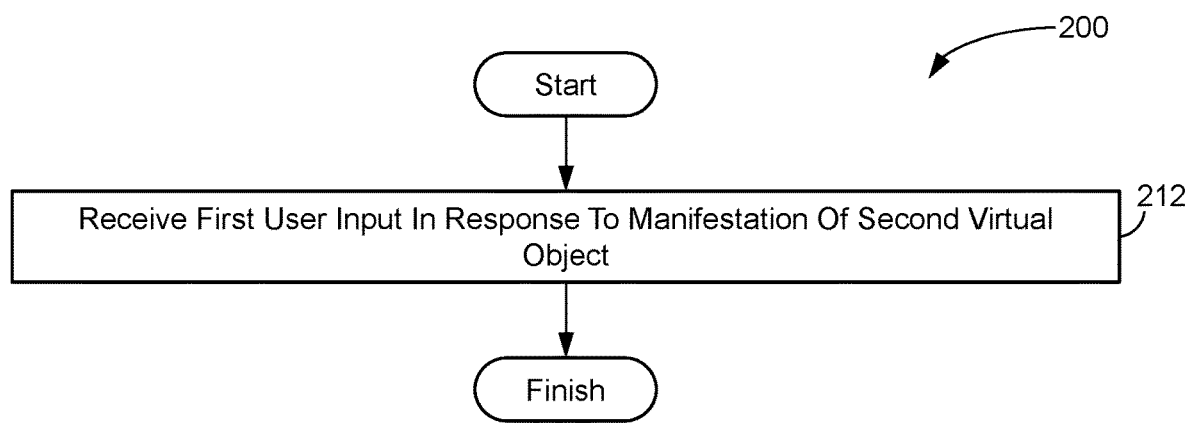

FIG. 2C illustrates method 200, in accordance with one or more embodiments.

An operation 212 may include receiving first user input in response to the manifestation of the second virtual object. Operation 212 may be performed by one or more hardware processors configured by machine-readable instructions including a module that is the same as or similar to user input receiving module 116, in accordance with one or more embodiments.

Figure 2D:
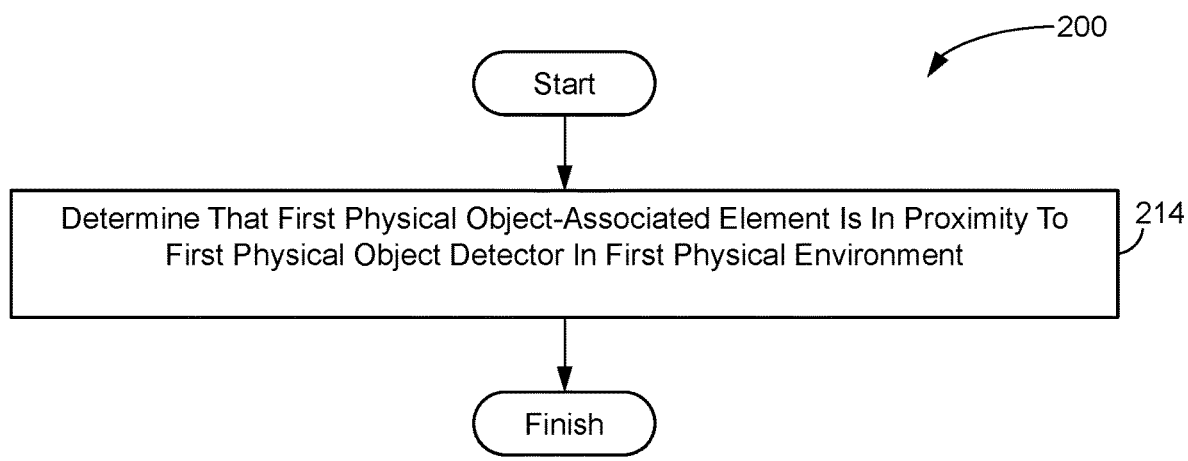

FIG. 2D illustrates method 200, in accordance with one or more embodiments.

An operation 214 may include determining that the first physical object-associated element is in proximity to the first physical object detector in the first physical environment. Operation 214 may be performed by one or more hardware processors configured by machine-readable instructions including a module that is the same as or similar to element determination module 118, in accordance with one or more embodiments.

Figure 2E:
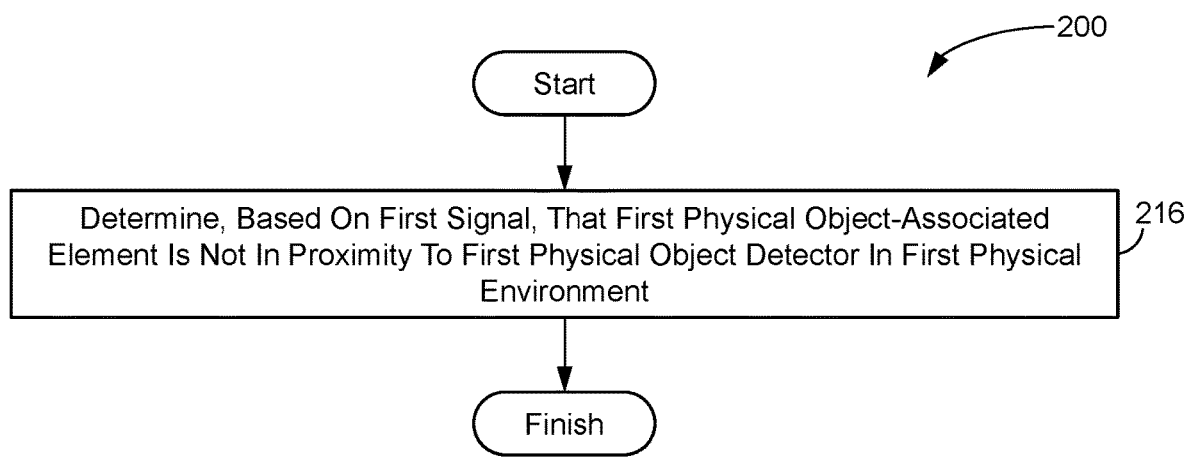

FIG. 2E illustrates method 200, in accordance with one or more embodiments.

An operation 216 may include determining, based on the first signal, that the first physical object-associated element is not in proximity to the first physical object detector in the first physical environment. Operation 216 may be performed by one or more hardware processors configured by machine-readable instructions including a module that is the same as or similar to element determination module 118, in accordance with one or more embodiments.

Figure 2F:
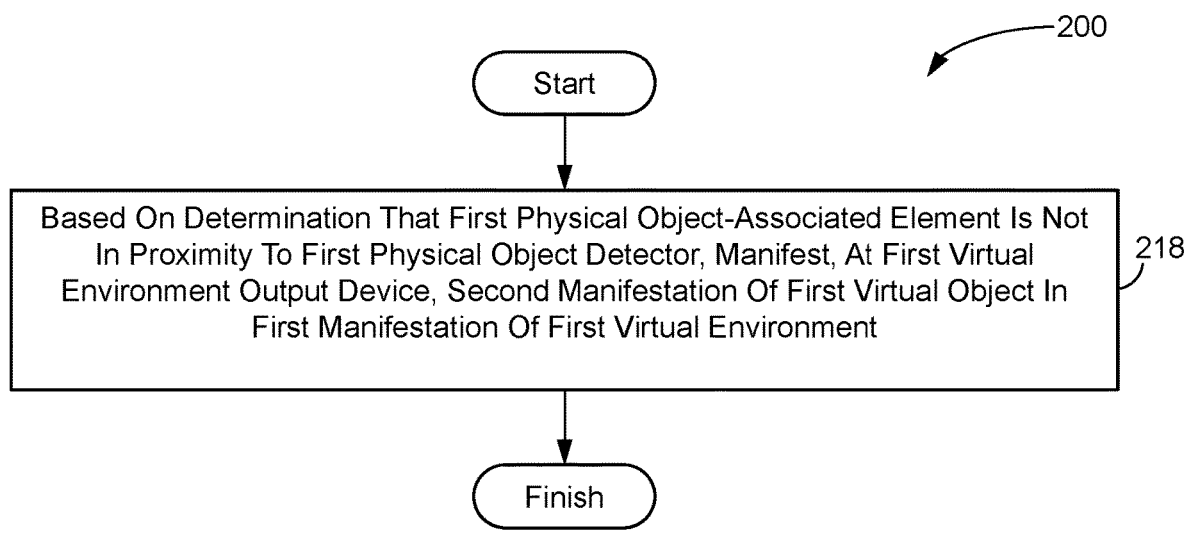

FIG. 2F illustrates method 200, in accordance with one or more embodiments.

An operation 218 may include based on the determination that the first physical object-associated element is not in proximity to the first physical object detector, manifesting, at the first virtual environment output device, a second manifestation of the first virtual object in the first manifestation of the first virtual environment. The second manifestation of the first virtual object may differ from the first manifestation of the first virtual object. Operation 218 may be performed by one or more hardware processors configured by machine-readable instructions including a module that is the same as or similar to manifestation manifesting module 114, in accordance with one or more embodiments.

Figure 2G:
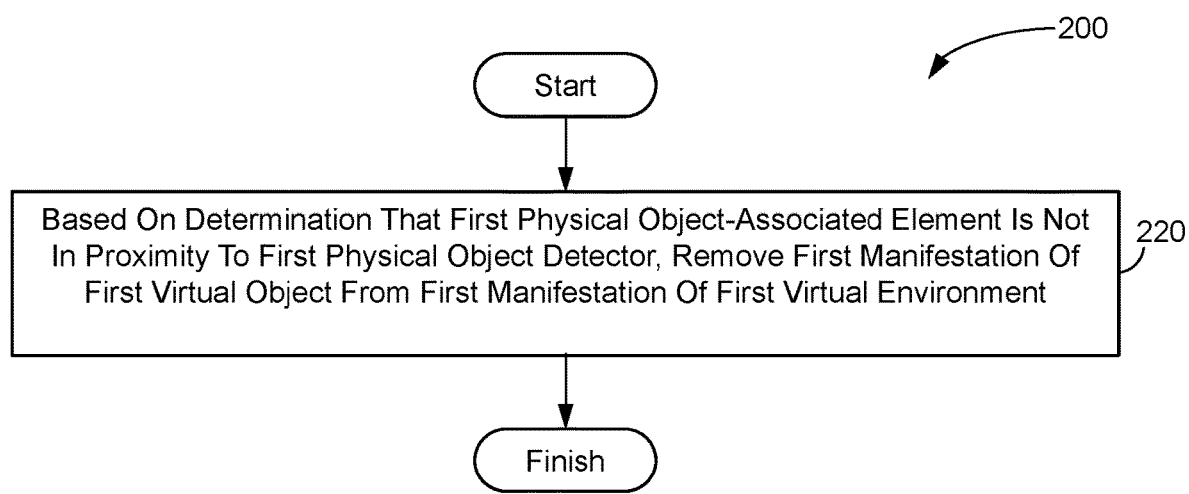

FIG. 2G illustrates method 200, in accordance with one or more embodiments.

An operation 220 may include based on the determination that the first physical object-associated element is not in proximity to the first physical object detector, removing the first manifestation of the first virtual object from the first manifestation of the first virtual environment. Operation 220 may be performed by one or more hardware processors configured by machine-readable instructions including a module that is the same as or similar to manifestation removing module 120, in accordance with one or more embodiments.

Figure 2H:
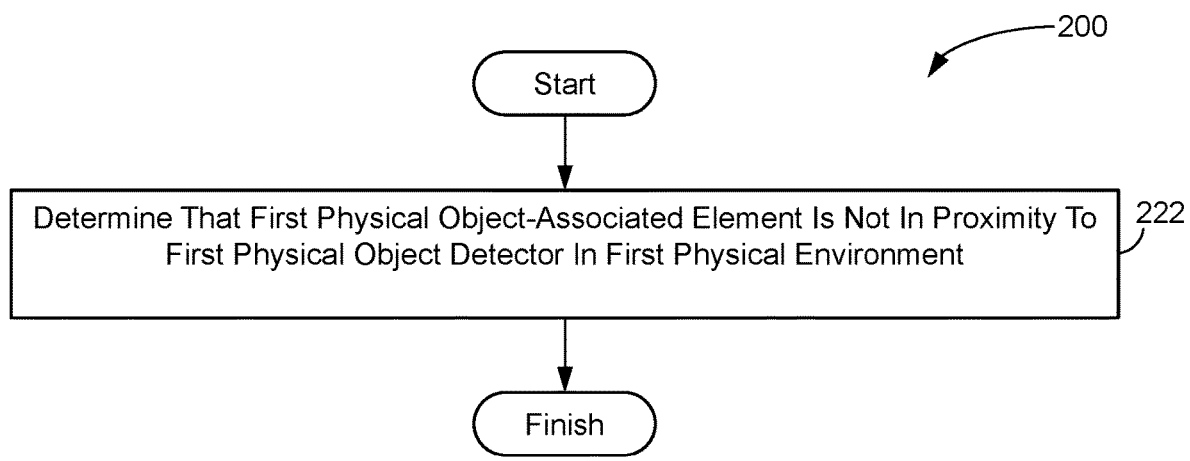

FIG. 2H illustrates method 200, in accordance with one or more embodiments.

An operation 222 may include determining that the first physical object-associated element is not in proximity to the first physical object detector in the first physical environment. Operation 222 may be performed by one or more hardware processors configured by machine-readable instructions including a module that is the same as or similar to element determination module 118, in accordance with one or more embodiments.

Figure 2I:
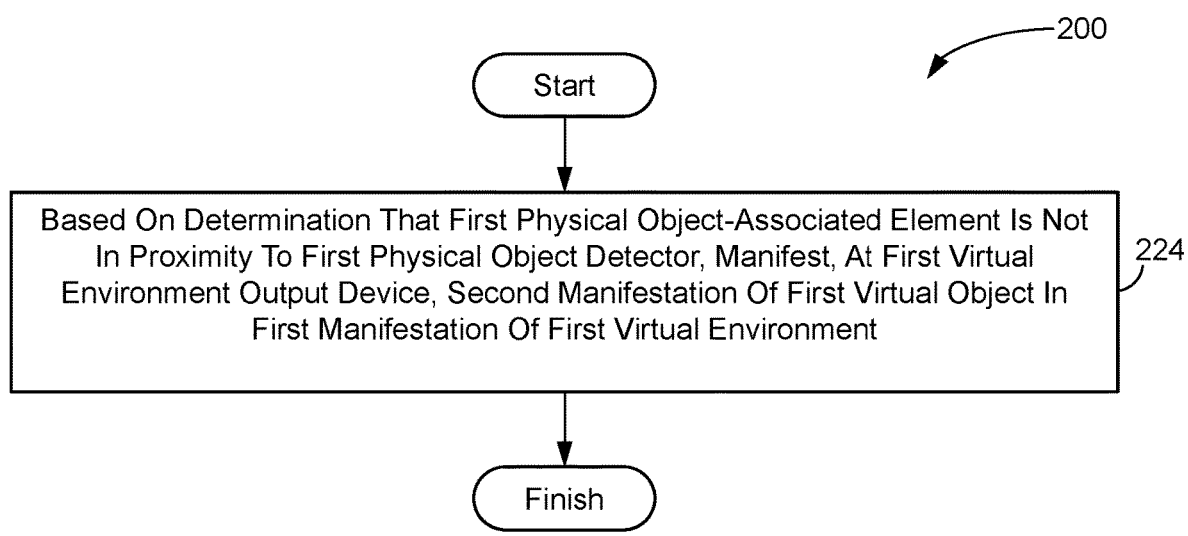

FIG. 2I illustrates method 200, in accordance with one or more embodiments.

An operation 224 may include based on the determination that the first physical object-associated element is not in proximity to the first physical object detector, manifesting, at the first virtual environment output device, a second manifestation of the first virtual object in the first manifestation of the first virtual environment. The second manifestation of the first virtual object may differ from the first manifestation of the first virtual object. Operation 224 may be performed by one or more hardware processors configured by machine-readable instructions including a module that is the same as or similar to manifestation manifesting module 114, in accordance with one or more embodiments.

Figure 2J:
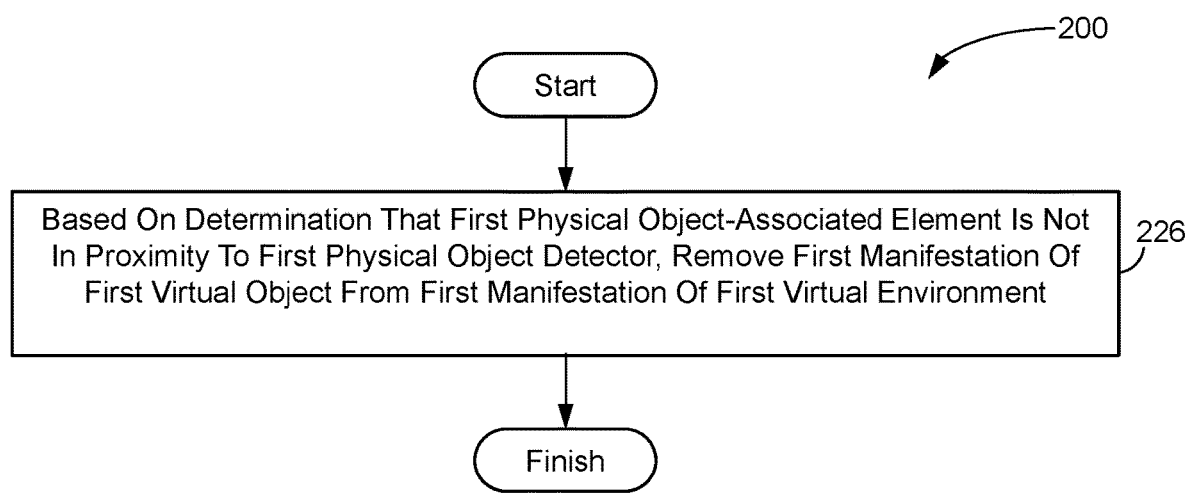

FIG. 2J illustrates method 200, in accordance with one or more embodiments.

An operation 226 may include based on the determination that the first physical object-associated element is not in proximity to the first physical object detector, removing the first manifestation of the first virtual object from the first manifestation of the first virtual environment. Operation 226 may be performed by one or more hardware processors configured by machine-readable instructions including a module that is the same as or similar to manifestation removing module 120, in accordance with one or more embodiments.

Figure 2K:
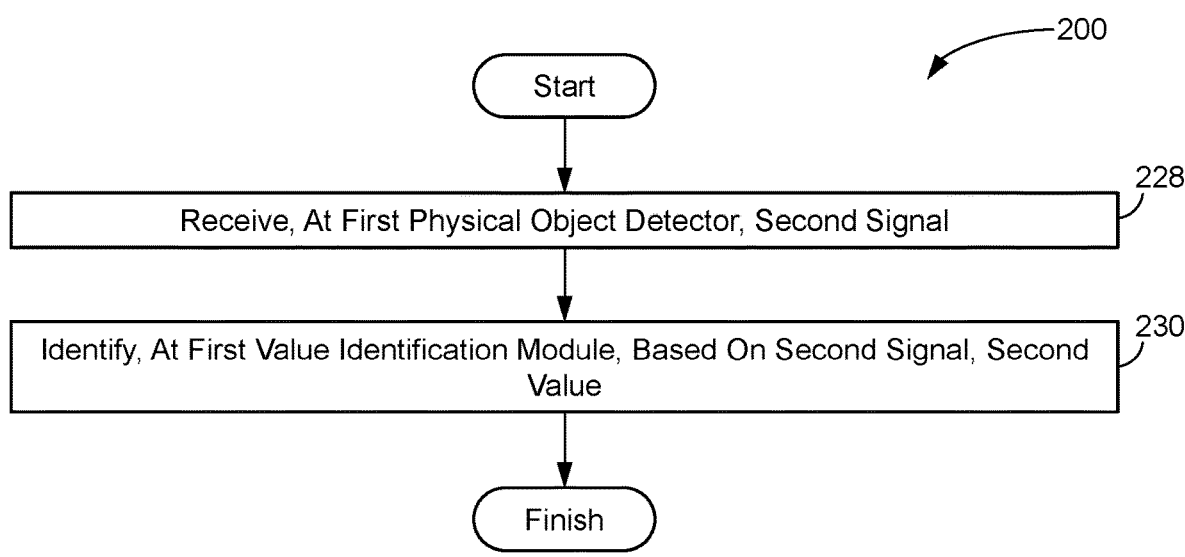

FIG. 2K illustrates method 200, in accordance with one or more embodiments.

An operation 228 may include receiving, at the first physical object detector, a second signal. Operation 228 may be performed by one or more hardware processors configured by machine-readable instructions including a module that is the same as or similar to signal receiving module 108, in accordance with one or more embodiments.

An operation 230 may include identifying, at the first value identification module, based on the second signal, a second value. Operation 230 may be performed by one or more hardware processors configured by machine-readable instructions including a module that is the same as or similar to value identifying module 110, in accordance with one or more embodiments.

Figure 2L:
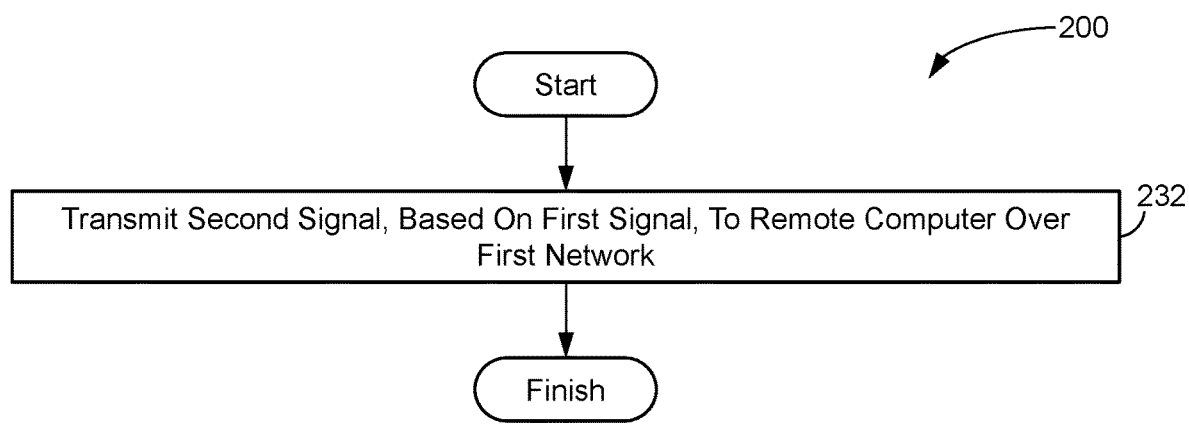

FIG. 2L illustrates method 200, in accordance with one or more embodiments.

An operation 232 may include transmitting a second signal, based on the first signal, to a remote computer over a first network. Operation 232 may be performed by one or more hardware processors configured by machine-readable instructions including a module that is the same as or similar to signal transmittal module 122, in accordance with one or more embodiments.

Figure 2M:
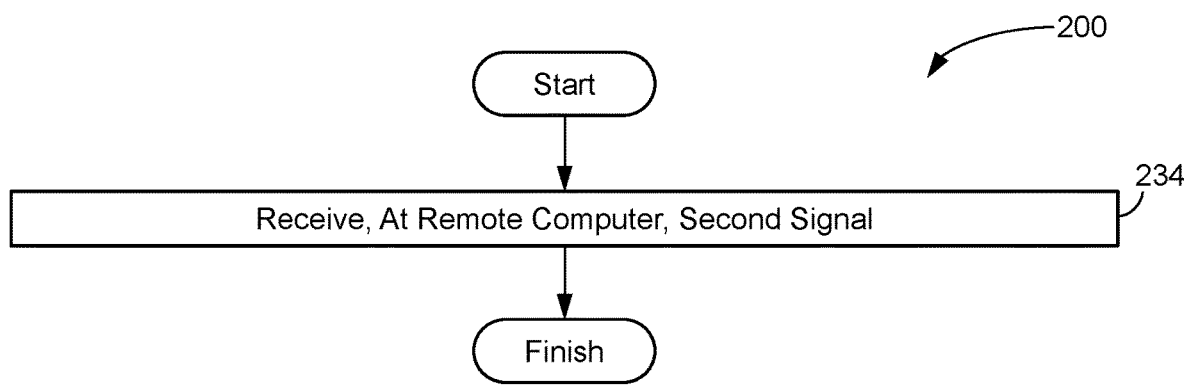

FIG. 2M illustrates method 200, in accordance with one or more embodiments.

An operation 234 may include receiving, at the remote computer, the second signal. Operation 234 may be performed by one or more hardware processors configured by machine-readable instructions including a module that is the same as or similar to signal receiving module 108, in accordance with one or more embodiments.

Figure 2N:
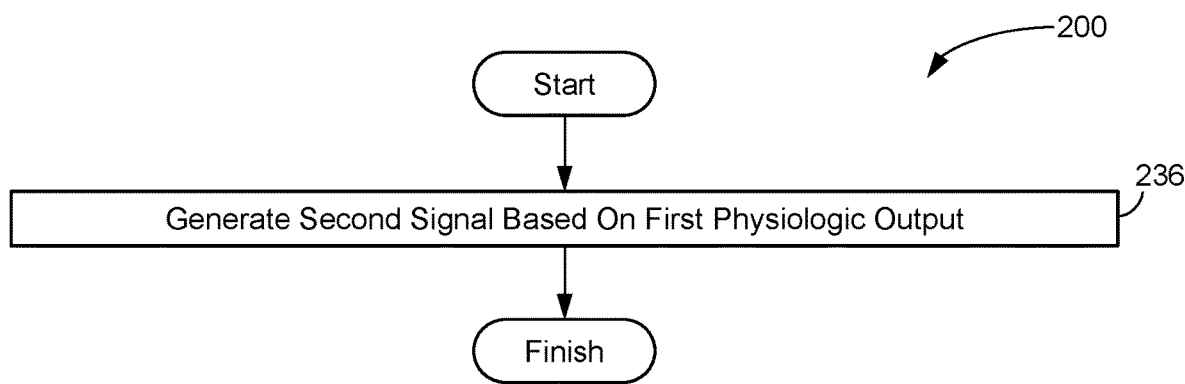

FIG. 2N illustrates method 200, in accordance with one or more embodiments.

An operation 236 may include generating the second signal based on the first physiologic output. Operation 236 may be performed by one or more hardware processors configured by machine-readable instructions including a module that is the same as or similar to signal generating module 124, in accordance with one or more embodiments.

Figure 2O:
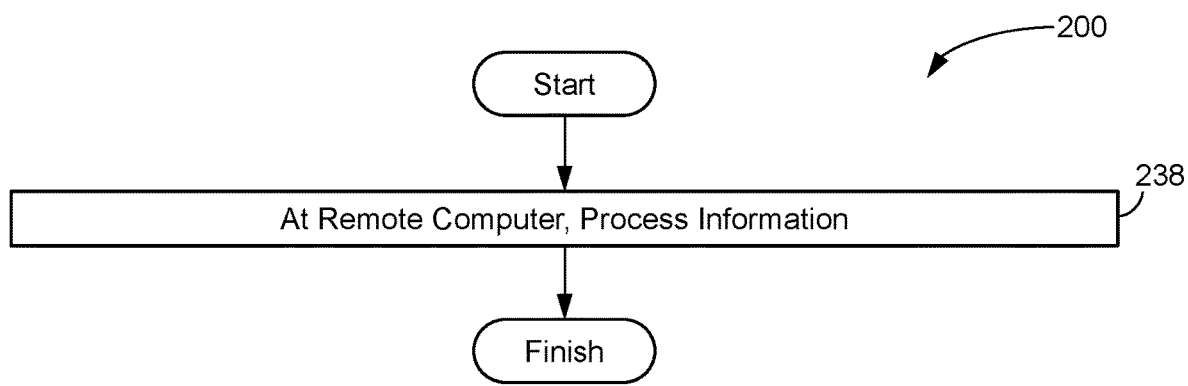

FIG. 2O illustrates method 200, in accordance with one or more embodiments.

An operation 238 may include at the remote computer, processing information. Operation 238 may be performed by one or more hardware processors configured by machine-readable instructions including a module that is the same as or similar to information processing module 126, in accordance with one or more embodiments.

Figure 2P:
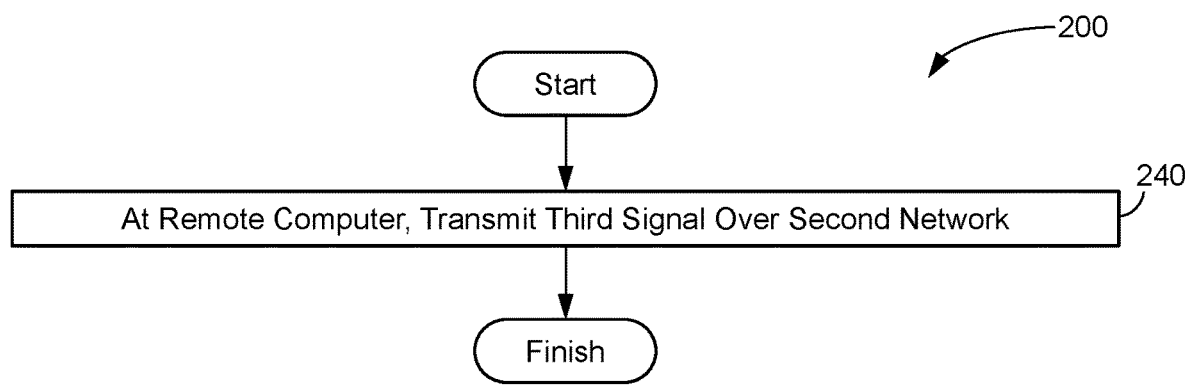

FIG. 2P illustrates method 200, in accordance with one or more embodiments.

An operation 240 may include at the remote computer, transmitting a third signal over a second network. Operation 240 may be performed by one or more hardware processors configured by machine-readable instructions including a module that is the same as or similar to signal transmittal module 122, in accordance with one or more embodiments.

Figure 2Q:
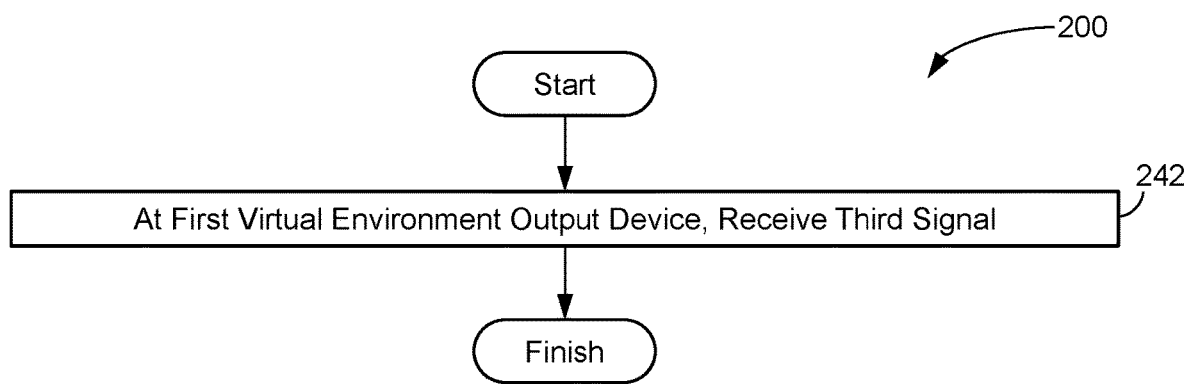

FIG. 2Q illustrates method 200, in accordance with one or more embodiments.

An operation 242 may include at the first virtual environment output device, receiving the third signal. Operation 242 may be performed by one or more hardware processors configured by machine-readable instructions including a module that is the same as or similar to signal receiving module 108, in accordance with one or more embodiments.

Figure 2R:
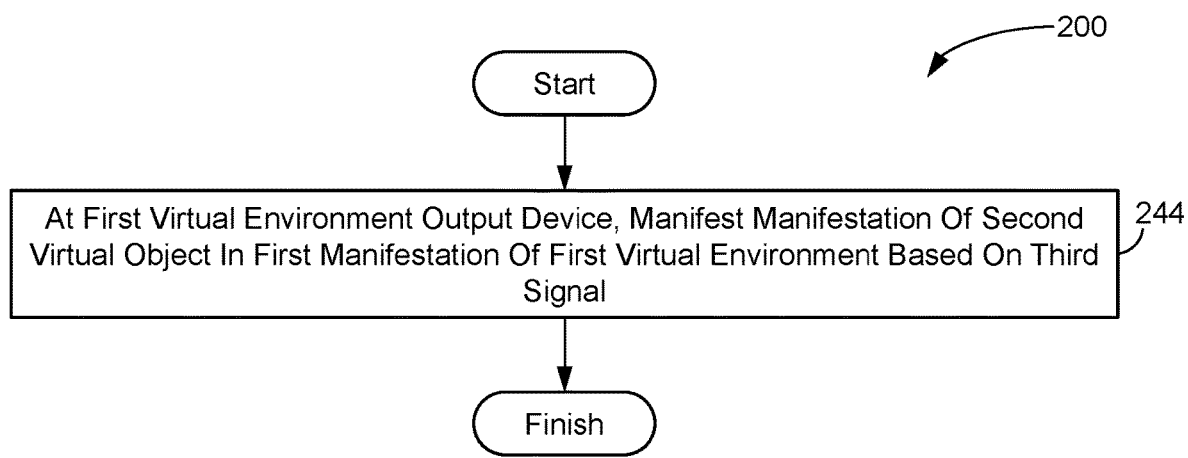

FIG. 2R illustrates method 200, in accordance with one or more embodiments.

An operation 244 may include at the first virtual environment output device, manifesting a manifestation of a second virtual object in the first manifestation of the first virtual environment based on the third signal. Operation 244 may be performed by one or more hardware processors configured by machine-readable instructions including a module that is the same as or similar to manifestation manifesting module 114, in accordance with one or more embodiments.

Figure 2S:
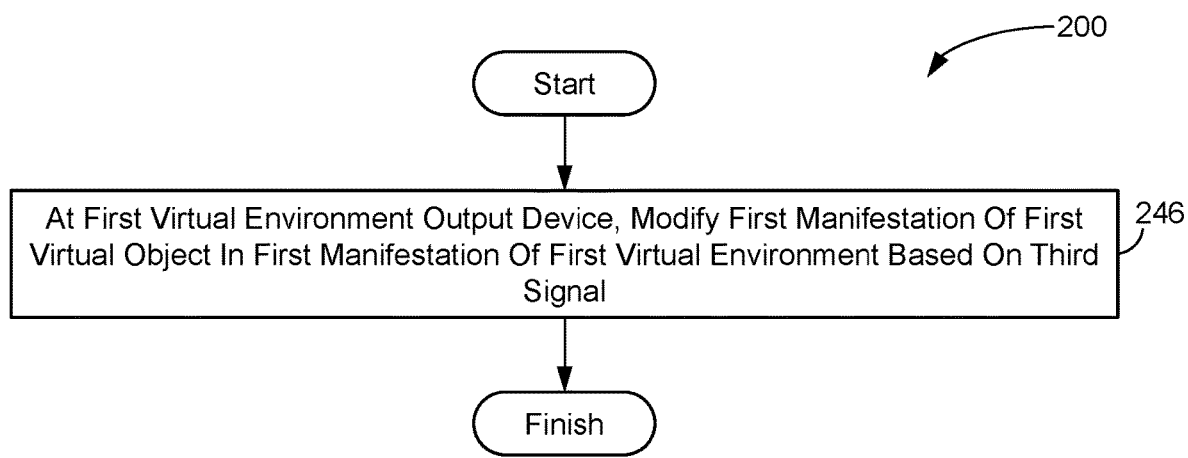

FIG. 2S illustrates method 200, in accordance with one or more embodiments.

An operation 246 may include at the first virtual environment output device, modifying the first manifestation of the first virtual object in the first manifestation of the first virtual environment based on the third signal. Operation 246 may be performed by one or more hardware processors configured by machine-readable instructions including a module that is the same as or similar to manifestation modification module 128, in accordance with one or more embodiments.

Figure 2T:
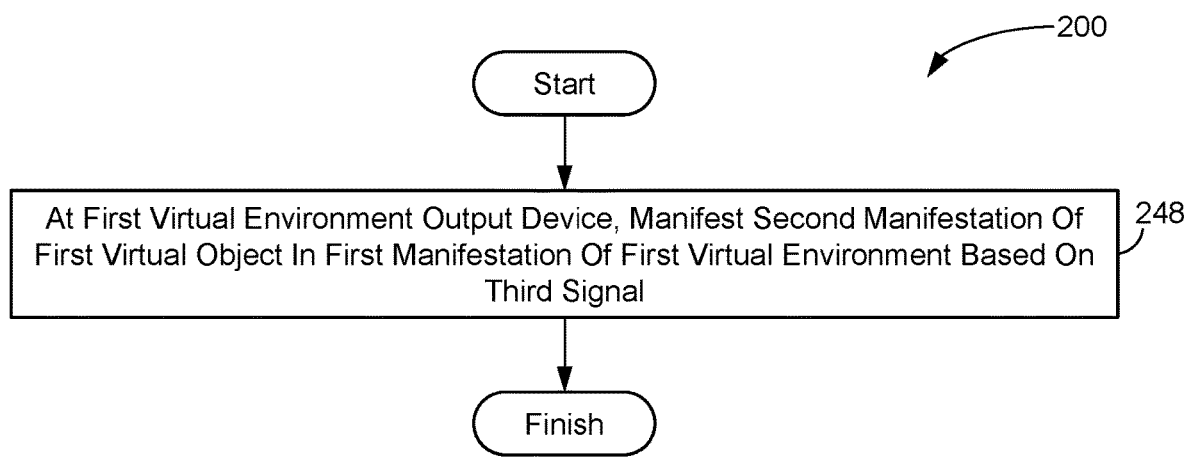

FIG. 2T illustrates method 200, in accordance with one or more embodiments.

An operation 248 may include at the first virtual environment output device, manifesting a second manifestation of the first virtual object in the first manifestation of the first virtual environment based on the third signal. Operation 248 may be performed by one or more hardware processors configured by machine-readable instructions including a module that is the same as or similar to manifestation manifesting module 114, in accordance with one or more embodiments.

Figure 2U:
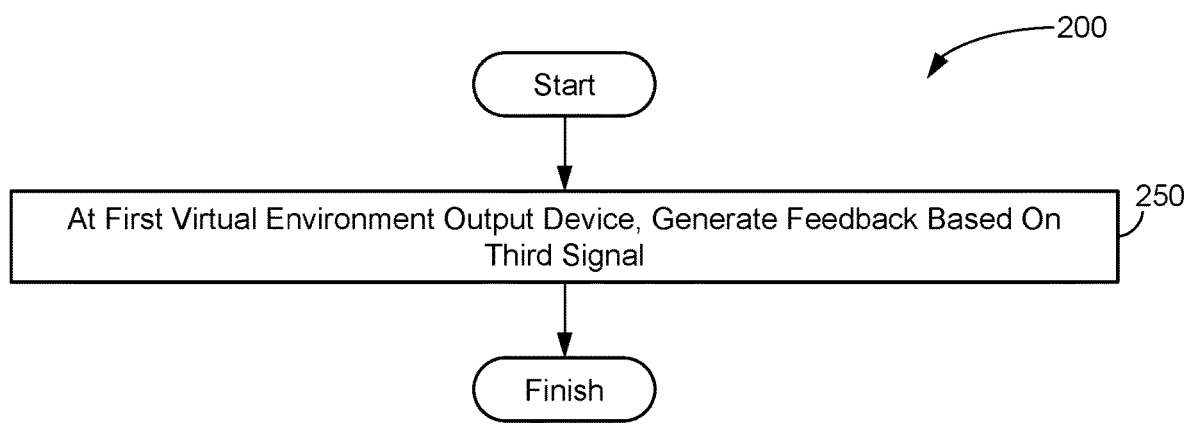

FIG. 2U illustrates method 200, in accordance with one or more embodiments.

An operation 250 may include at the first virtual environment output device, generating feedback based on the third signal. Operation 250 may be performed by one or more hardware processors configured by machine-readable instructions including a module that is the same as or similar to feedback generating module 130, in accordance with one or more embodiments.

As described herein, embodiments of the present invention may manifest (or change, or remove) a first manifestation of a first virtual object in a first manifestation of a first virtual environment, in response to determining that a first physical object-associated element is in proximity to a first physical object detector in a first physical environment, wherein the first physical object-associated element is associated with a first physical object in the first physical environment. Some embodiments may manifest the first manifestation of the first virtual object in the first manifestation of the first virtual environment in response to determining that: (1) the first physical object-associated element is in proximity to the first physical object detector in the first physical environment; and (2) an additional condition (other than proximity of the first physical object-associated element with the first physical object detector) is satisfied.

Examples of such an additional condition include, but are not limited to, any one or more of the following, in any combination:

a subsequent determination that the first physical object-associated element is in proximity to the first physical object detector in the first physical environment, examples of which include:

determining, at a first time in (1) above, that the first physical object-associated element is in proximity to the first physical object detector in the first physical environment; then determining at a second time, later than the first time, that the first physical object-associated element is not in proximity to the first physical object detector in the first physical environment; then determining, at a third time, later than the second time, that the first physical object-associated element is in proximity to the first physical object detector in the first physical environment;

determining, at a first time in (1) above, that the first physical object-associated element is in proximity to the first physical object detector in the first physical environment; then determining at a second time, later than the first time, that the first physical object-associated element is not in proximity to the first physical object detector in the first physical environment;

determining, at a first time in (1) above, that the first physical object-associated element is in proximity to the first physical object detector in the first physical environment; then determining at a second time, later than the first time, that the first physical object-associated element is in proximity to the first physical object detector in the first physical environment;

a determination that the first physical object-associated element has been in proximity to the first physical object detector for at least some predetermined amount of time;

a determination that the duration of proximity between the first physical object-associated element and the first physical object detector (e.g., the amount of time that has elapsed since the first physical object-associated element and the first physical object detector were determined to be in proximity to each other) otherwise satisfies a temporal condition;

a determination that the current time is equal to a predetermined time (e.g., Jan. 1, 2050 at 12:30 pm), that some amount of time has elapsed, or that the current time otherwise satisfies a temporal condition;

a determination that the first physical object-associated element is in proximity to a second physical object detector in the first physical environment, wherein the first physical object detector and the second physical object detector are distinct from each other;

a determination that a value of a physical parameter of a user satisfies a condition; or a determination that a behavior of a user satisfies a condition.

As merely one example of the above use of an additional condition, consider a case in which a first user (or a first device associated with a first user) is determined to be in proximity with a first physical object detector at a first time. Either before the first time, at or during the first time, or after the first time, a trigger or event occurs. Examples of such a trigger or event include, for example: a second instance of proximity between the user (or the user's device) and the first physical object (or a physical object other than the first physical object); a change in state of the first user (or the first device), such as a change in a physiologic state of the first user, a particular movement of the first user (e.g., movement of one or both of the user's eyes, as determined using eye-tracking technology), or particular words spoken by the first user; a change in a state of the first physical environment, such as change in temperature, weather, or environmental condition of the first physical environment, or a visual or auditory signal detected in the first physical environment; and manual input received from the first user (e.g., via the first device).

As described herein, embodiments of the present invention may manifest (or change, or remove) a first manifestation of a first virtual object in a first manifestation of a first virtual environment, in response to determining that a first physical object-associated element is in proximity to a first physical object detector in a first physical environment, wherein the first physical object-associated element is associated with a first physical object in the first physical environment. In some embodiments, the first virtual object and/or the first manifestation of the first virtual object includes any one or more of the following, in any combination:

context-relevant content (e.g., any one or more of audio, video, and text);

an icon or other graphical content which, when selected by a user, causes an embodiment of the present invention do display context-relevant content; and a menu or other plurality of context-relevant content (e.g., a menu which can be opened, expanded, or otherwise explored to provide context-relevant content that may be selected by a user to access such content).

Examples of context-relevant content include, but are not limited to, any one or more of the following, in any combination: audio (e.g., spoken words, music); video (e.g., instruction or promotional video); advertisements or promotions; and icons or links that enable a user to access context-specific content. Context-relevant content may, for example, be available from and/or served by third-party content sources, such as YouTube, TikTok, Facebook, Instagram, or Spotify, as well as other third-party generated content.

The term "context-relevant" in "context-relevant content" refers to content which is generated and/or selected by embodiments of the present invention based on one or more attributes of any one or more of the following, in any combination:

the first physical environment;
the first virtual environment;
the first virtual object;
the first physical object;
the first physical object-associated element;
the first physical object detector;
a user of any of the above;
a device of such a user.

Such attributes may, for example, be current attributes, past attributes, or a combination thereof.

As merely one example of the above, consider a case in which a first user (or a device associated with a first user) is determined to be in proximity with a first physical object. At some time following the determination of proximity, a first virtual object is generated, implemented, or presented to the first user by means of the first user's virtual environment output means. In one embodiment, the first virtual object is an icon that enables the first user to select the icon (within the first virtual environment) in order to view context-relevant content in the first virtual environment, e.g., at an AR/VR device. In this example, the context-relevant content may be a video with information relating to the first physical object. Other types of context-relevant content may also be made available to/presented to the first user, e.g., text, instructions, directions, coupons, promotional offers, purchase offers, and virtual object selections.

In some embodiments, the techniques described herein relate to a system configured for manifesting a virtual object in a first virtual environment, the system including: one or more hardware processors configured by machine-readable instructions to: (a) receive, at a first physical object detector, a first signal, from a first physical object-associated element in a first physical environment, wherein the first physical object-associated element is associated with a first physical object in the first physical environment, wherein the first signal contains information representing an identity of the first physical object; (b) identify, at a first value identification module, based on the first signal, a first value associated with the first signal, wherein the first value is associated with the first physical object; (c) identify, at a first virtual object identification module, based on the first value, a first virtual object; and (d) manifest, at a first virtual environment output device, a first manifestation of the first virtual object in a first manifestation of the first virtual environment.

The first virtual object may include a first simulation of the first physical object. The first virtual object may include at least one of a virtual object, a virtual personal object, a virtual commercial object, a virtual industrial object, a virtual military object, a virtual item of clothing, a virtual item of footwear, a virtual mode of transportation, a virtual bicycle, a virtual automobile, a virtual aircraft, a virtual boat, a virtual ship, a virtual drone, a virtual scooter, a virtual machine, virtual equipment, a virtual food, a virtual tool, a virtual implement, a place, a virtual residential setting, a person, a first virtual experience, a promotion, a performance, a concert, a non-fungible token, digital content, text, audio, video, a virtual button, a virtual presentation of two or more selectable virtual objects. The digital content may relate to the first physical object, and the digital content may include at least one of a promotion for the first physical object, a promotion for a second physical object that is related to the first physical object, a promotion for a second virtual object that is related to the first physical object, instructions for using the first physical object, directions to the first physical object, directions to a location related to the first physical object, a discount or code, and information describing the first physical object.

Identifying the first virtual object may include generating the first virtual object. Identifying the first virtual object may include selecting an existing virtual object in the first virtual environment as the first virtual object. Identifying the first virtual object may include modifying an existing virtual object in the first virtual environment. Identifying the first virtual object may include replacing an existing virtual object in the first virtual environment with the first virtual object.

Manifesting the first manifestation of the first virtual object may include generating first visual output representing the first virtual object. Manifesting the first manifestation of the first virtual object may include generating first visual output relating to the first virtual object. The first visual output may include at least one of text output, audio output, and video output. Generating the first visual output may include generating the first visual output based on the first signal.

The one or more hardware processors may further be configured by machine-readable instructions to: (e) receive first user input directed to the first manifestation of the first virtual object.

Manifesting the first manifestation of the first virtual object may include delaying by an amount of time before manifesting the first manifestation of the first virtual object.

The first virtual environment output device may include at least one of a virtual reality output means and an augmented reality output means. The first virtual environment may include at least one of a virtual reality environment and an augmented reality environment.

The one or more hardware processors may further be configured by machine-readable instructions to: (e) determine that the first physical object-associated element is in proximity to the first physical object detector in the first physical environment. Determining that the first physical object-associated element is in proximity to the first physical object detector may include determining that the first physical object-associated element is in proximity to the first physical object detector based on the first signal. Receiving the first signal may be performed in response to determining that the first physical object-associated element is in proximity to the first physical object detector in the first physical environment. Determining that the first physical object-associated element is in proximity to the first physical object detector in the first physical environment may include determining that the first physical object-associated element is in proximity to the first physical object detector in the first physical environment based on a presence of the first signal.

Receiving the first signal may include receiving the first signal via an electromagnetic receiver means, and the first signal may include an electromagnetic signal.

In some embodiments, the techniques described herein relate to a method for manifesting a virtual object in a first virtual environment, the method including: (a) receiving, at a first physical object detector, a first signal, from a first physical object-associated element in a first physical environment, wherein the first physical object-associated element is associated with a first physical object in the first physical environment; (b) identifying, at a first value identification module, based on the first signal, a first value associated with the first signal, wherein the first value is associated with the first physical object; (c) identifying, at a first virtual object identification module, based on the first value, a first virtual object; and (d) manifesting, at a first virtual environment output device, a first manifestation of the first virtual object in a first manifestation of the first virtual environment.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

The term "distinct," as used herein in connection with any object A and object B, indicates that objects A and B are not completely coextensive with each other in space. The term "same," as used herein in connection with any object A and object B, indicates that objects A and B are not distinct. As this implies, if objects A and B are completely coextensive with each other in space, then they are the same object, and if two objects A and B are the same object, then they are completely coextensive with each other in space.

As the definition above implies, two objects A and B may be distinct and be completely non-coextensive with each other in space. Consider an example in which object A is a first chair and object B is a second chair, and in which the first chair and the second chair are completely non-coextensive with each other in space. In all of the following embodiments, the first chair and the second chair would satisfy the definition herein of "distinct":

The first chair and the second chair are in contact with each other.

The first chair and the second chair are not in contact with each other.

The first chair and the second chair are not in contact with each other, but are coupled to each other by one or more media, such as glue, a fastener, an aspect or element of one of the objects, or another object.

The first chair and the second chair are not in contact with each other, are separated from each other in space, and are not coupled to each other.

As the definition above implies, two objects A and B may be distinct and be partially, but not completely, coextensive with each other in space. Consider an example in which object A is a first chair and object B is a second chair, and in which the first chair and the second chair are partially, but not completely, coextensive with each other in space. An example of this would be that the first chair and the second chair share a back in common, such that the first and second chairs are facing in opposite directions.

Two distinct objects may or may not have the same properties as each other. For example, two chairs may be distinct from each other even if they are the same model of chair, and even if they are indistinguishable from each other to a human observer. As another example, two chairs which are different models, and which are not entirely coextensive in space, are an example of two distinct objects.

The term "distinct," as used herein, may apply to physical objects and virtual objects. In the case of distinct physical objects, the space that distinct physical objects occupy is physical space, and any space between distinct physical objects is physical space. In the case of distinct virtual objects, the space that distinct virtual objects occupy is virtual space, and any space between the distinct virtual objects is virtual space.

Labels such as "first" and "second" herein do not imply an order or sequence, either spatially or temporally. For example, references herein to "a first object" and "a second object" do not imply that the first object necessarily is located spatially before the second object, or that an action necessarily is performed by or on the first object before being performed by or on the second object. Similarly, references herein to "a first action" and "a second action" do not imply that the first action necessarily is performed before the second action. Any reference herein to a "first" object or action does not imply that there necessarily is a second object or action.

In some embodiments, terms such as "first" and "second" refer to distinct elements. For example, in some embodiments, a reference herein to "a first object" and "a second object" refers to a first object which is distinct from a second object, as the term "distinct" is used herein. As one example, in some embodiments the first object may be a first chair, the second object may be a second chair, and the first chair may not be completely coextensive in space with the second chair. As one particular example, the first chair and the second chair may be completely non-coextensive with each other in space, and may be separated from each other by some amount of space.

In other embodiments, terms such as "first" and "second" refer to non-distinct elements. For example, in some embodiments, a reference herein to "a first chair" and a reference to "a second chair" both refer to the same (physical or virtual) chair. In such cases, terms such as "first" and "second" are used to label the references to the referenced element, not to imply that there are multiple instances of the referenced element itself.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. For example, embodiments of the present invention display virtual objects within a virtual environment, such as a simulated three-dimensional environment displayed on a display monitor or via a virtual reality display. Such features are inherently rooted in computer technology and cannot be performed mentally or manually.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random-access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or grayscale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

The terms "A or B," "at least one of A or/and B," "at least one of A and B," "at least one of A or B," or "one or more of A or/and B" used in the various embodiments of the present disclosure include any and all combinations of words enumerated with it. For example, "A or B," "at least one of A and B" or "at least one of A or B" may mean: (1) including at least one A, (2) including at least one B, (3) including either A or B, or (4) including both at least one A and at least one B.

Any description herein of an act of identifying the existence of an object, state, value, or condition may include determining that the object, state, value, or condition exists.

Any description herein of an act of identifying the existence of an object, state, value, or condition may include determining whether the object, state, value, or condition exists.

In some embodiments of the present invention, a first element of a system may communicate an identifier (or a representation of an identity) of a physical object to a second element of the system. The identifier may, for example, be an identifier of the physical object, an identifier of a user, an identifier of a device, or an identifier of a software application executing on a computer or other electronic processing means.

What is claimed is:

1. A system configured for manifesting a virtual object in a first virtual environment, the system comprising:
    one or more hardware processors configured by machine-readable instructions to:
    (a) receive, at a first physical object detector, a first signal, from a first physical object-associated element in a first physical environment, wherein the first physical object-associated element is associated with a first physical object in the first physical environment, wherein the first physical object-associated element is distinct from the first physical object, and wherein the first signal contains information representing an identity of the first physical object;
    (b) identify, at a first value identification module, based on the first signal, a first value associated with the first signal, wherein the first value is associated with the first physical object;
    (c) identify, at a first virtual object identification module, based on the first value, a first virtual object;
    (d) manifest, at a first virtual environment output device, a first manifestation of the first virtual object in a first manifestation of the first virtual environment;
    (e) determine that the first physical object is not in proximity to the first physical object detector in the first physical environment based on an absence of the first signal; and
    (f) in response to determining that the first physical object is not in proximity to the first physical object detector in the first physical environment, remove the first manifestation of the first virtual object from the first manifestation of the first virtual environment.

2. The system of claim 1, wherein the first virtual object comprises a first simulation of the first physical object.

3. The system of claim 1, wherein the first virtual object comprises at least one of a virtual object, a virtual personal object, a virtual commercial object, a virtual industrial object, a virtual military object, a virtual item of clothing, a virtual item of footwear, a virtual mode of transportation, a virtual bicycle, a virtual automobile, a virtual aircraft, a virtual boat, a virtual ship, a virtual drone, a virtual scooter, a virtual machine, virtual equipment, a virtual food, a virtual tool, a virtual implement, a place, a virtual residential setting, a person, a first virtual experience, a promotion, a performance, a concert, a non-fungible token, digital content, text, audio, video, a virtual button, a virtual presentation of two or more selectable virtual objects.

4. The system of claim 3, wherein the digital content relates to the first physical object, and wherein the digital content comprises at least one of a promotion for the first physical object, a promotion for a second physical object that is related to the first physical object, a promotion for a second virtual object that is related to the first physical object, instructions for using the first physical object, directions to the first physical object, directions to a location related to the first physical object, a discount or code, and information describing the first physical object.

5. The system of claim 1, wherein identifying the first virtual object comprises generating the first virtual object.

6. The system of claim 1, wherein identifying the first virtual object comprises selecting an existing virtual object in the first virtual environment as the first virtual object.

7. The system of claim 1, wherein identifying the first virtual object comprises modifying an existing virtual object in the first virtual environment.

8. The system of claim 1, wherein identifying the first virtual object comprises replacing an existing virtual object in the first virtual environment with the first virtual object.

9. The system of claim 1, wherein manifesting the first manifestation of the first virtual object comprises generating first visual output representing the first virtual object.

10. The system of claim 1, wherein manifesting the first manifestation of the first virtual object comprises generating first visual output relating to the first virtual object.

11. The system of claim 10, wherein the first visual output comprises at least one of text output, audio output, and video output.

12. The system of claim 10, wherein generating the first visual output comprises generating the first visual output based on the first signal.

13. The system of claim 10, wherein the one or more hardware processors are further configured by machine-readable instructions to:
    (g) receive first user input directed to the first manifestation of the first virtual object.

14. The system of claim 1, wherein manifesting the first manifestation of the first virtual object comprises delaying by an amount of time before manifesting the first manifestation of the first virtual object.

15. The system of claim 1, wherein the first virtual environment output device comprises at least one of a virtual reality output means and an augmented reality output means.

16. The system of claim 1, wherein the first virtual environment comprises at least one of a virtual reality environment and an augmented reality environment.

17. The system of claim 1, wherein the one or more hardware processors are further configured by machine-readable instructions to:
    (g) before (a), determine that the first physical object is in proximity to the first physical object detector in the first physical environment.

18. The system of claim 17, wherein determining that the first physical object is in proximity to the first physical object detector comprises determining that the first physical object is in proximity to the first physical object detector based on the first signal.

19. The system of claim 18, wherein (g) comprises determining that the first physical object is in proximity to the first physical object detector in the first physical environment based on a presence of the first signal.

20. The system of claim 17, wherein (a) is performed in response to determining that the first physical object is in proximity to the first physical object detector in the first physical environment.

21. The system of claim 1, wherein receiving the first signal comprises receiving the first signal via an electromagnetic receiver means, and wherein the first signal comprises an electromagnetic signal.

22. The system of claim 1, wherein the first signal comprises a first code.

23. The system of claim 22, wherein the first code represents an identity of the first physical object.

24. The system of claim 1, wherein the first signal represents an identity of the first physical object.

25. The system of claim 1, wherein determining that the first physical object is not in proximity to the first physical object detector in the first physical environment comprises determining that the first physical object detector and the first physical object is at least a particular distance apart from each other.

26. The system of claim 1, wherein (f) further comprises removing the first virtual object from the first virtual environment in response to determining that the first physical object is not in proximity to the first physical object detector in the first physical environment.

27. A method for manifesting a virtual object in a first virtual environment, the method comprising:
   (a) receiving, at a first physical object detector, a first signal, from a first physical object-associated element in a first physical environment, wherein the first physical object-associated element is associated with a first physical object in the first physical environment, wherein the first physical object-associated element is distinct from the first physical object, and wherein the first signal contains information representing an identity of the first physical object;
   (b) identifying, at a first value identification module, based on the first signal, a first value associated with the first signal, wherein the first value is associated with the first physical object;
   (c) identifying, at a first virtual object identification module, based on the first value, a first virtual object;
   (d) manifesting, at a first virtual environment output device, a first manifestation of the first virtual object in a first manifestation of the first virtual environment;
   (e) determining that the first physical object is not in proximity to the first physical object detector in the first physical environment based on an absence of the first signal; and
   (f) in response to determining that the first physical object is not in proximity to the first physical object detector in the first physical environment, removing the first manifestation of the first virtual object from the first manifestation of the first virtual environment.

28. A system configured for manifesting a virtual object in a first virtual environment, the system comprising:
   one or more hardware processors configured by machine-readable instructions to:
      (a) receive, at a first physical object detector, a first signal, from a first physical object-associated element in a first physical environment, wherein the first physical object-associated element is associated with a first physical object in the first physical environment, wherein the first physical object-associated element is distinct from the first physical object, and wherein the first signal contains information representing an identity of the first physical object;
      (b) identify, at a first value identification module, based on the first signal, a first value associated with the first signal, wherein the first value is associated with the first physical object;
      (c) identify, at a first virtual object identification module, based on the first value, a first virtual object;
      (d) manifest, at a first virtual environment output device, a first manifestation of the first virtual object in a first manifestation of the first virtual environment;
      (e) determine that the first physical object is not in proximity to the first physical object detector in the first physical environment based on a change in a characteristic of the first signal; and
      (f) in response to determining that the first physical object is not in proximity to the first physical object detector in the first physical environment, remove the first manifestation of the first virtual object from the first manifestation of the first virtual environment.

29. A method for manifesting a virtual object in a first virtual environment, the method comprising:
   (a) receiving, at a first physical object detector, a first signal, from a first physical object-associated element in a first physical environment, wherein the first physical object-associated element is associated with a first physical object in the first physical environment, wherein the first physical object-associated element is distinct from the first physical object, and wherein the first signal contains information representing an identity of the first physical object;
   (b) identifying, at a first value identification module, based on the first signal, a first value associated with the first signal, wherein the first value is associated with the first physical object;
   (c) identifying, at a first virtual object identification module, based on the first value, a first virtual object;
   (d) manifesting, at a first virtual environment output device, a first manifestation of the first virtual object in a first manifestation of the first virtual environment;
   (e) determining that the first physical object is not in proximity to the first physical object detector in the first physical environment based on a change in a characteristic of the first signal; and
   (f) in response to determining that the first physical object is not in proximity to the first physical object detector in the first physical environment, removing the first manifestation of the first virtual object from the first manifestation of the first virtual environment.

* * * * *